United States Patent
Julia et al.

(10) Patent No.: US 9,786,199 B2
(45) Date of Patent: *Oct. 10, 2017

(54) SYSTEM AND METHOD FOR ASSISTING LANGUAGE LEARNING

(75) Inventors: Luc Julia, Oakland, CA (US); Jerome Dubreuil, San Francisco, CA (US); Jehen Bing, Manlo Park, CA (US)

(73) Assignee: Vocefy, Inc., Golden, CO (US)

( * ) Notice: Subject to any disclaimer, the term of this patent is extended or adjusted under 35 U.S.C. 154(b) by 252 days.

This patent is subject to a terminal disclaimer.

(21) Appl. No.: 13/596,638

(22) Filed: Aug. 28, 2012

(65) Prior Publication Data

US 2012/0322035 A1    Dec. 20, 2012

Related U.S. Application Data

(63) Continuation of application No. 10/996,888, filed on Nov. 22, 2004, now Pat. No. 8,272,874.

(51) Int. Cl.
*G09B 19/04* (2006.01)
*G09B 21/00* (2006.01)
*G09B 5/06* (2006.01)
*G09B 19/06* (2006.01)
*G10L 15/26* (2006.01)

(52) U.S. Cl.
CPC ............. *G09B 21/006* (2013.01); *G09B 5/06* (2013.01); *G09B 19/06* (2013.01); *G10L 15/26* (2013.01)

(58) Field of Classification Search
CPC ................................ G09B 19/04; G09B 19/06
USPC ................ 434/156, 167, 185, 308, 319, 320
See application file for complete search history.

(56) References Cited

U.S. PATENT DOCUMENTS

| | | | | |
|---|---|---|---|---|
| 6,290,504 B1 * | 9/2001 | Benitz et al. | | 434/185 |
| 6,296,489 B1 * | 10/2001 | Blass et al. | | 434/185 |
| 6,517,351 B2 * | 2/2003 | Spector | | 434/169 |
| 6,708,150 B1 * | 3/2004 | Hirayama et al. | | 704/243 |
| 2003/0139924 A1 * | 7/2003 | Balasuriya | | 704/231 |
| 2004/0006468 A1 * | 1/2004 | Gupta et al. | | 704/254 |

* cited by examiner

*Primary Examiner* — Kesha Frisby
(74) *Attorney, Agent, or Firm* — Lee & Hayes, PLLC

(57) ABSTRACT

Speech data from the operation of a speech recognition application is recorded over the course of one or more language learning sessions. The operation of the speech recognition application during each language learning sessions corresponds to a user speaking, and the speech recognition application generating text data. The text data may a recognition of what the user spoke. The speech data may comprise the text data, and confidence values that are an indication of an accuracy of the recognition. The speech data from each language learning session may be analyzed to determine an overall performance level of the user.

20 Claims, 15 Drawing Sheets

SYSTEM AND METHOD FOR ASSISTING LANGUAGE LEARNING

RELATED APPLICATIONS

This application is a Continuation of U.S. patent application Ser. No. 10/996,888, filed Nov. 22, 2004 now U.S. Pat. No. 8,272,874; the aforementioned priority application being hereby incorporated by reference in its respective entirety for all purposes.

TECHNICAL FIELD

The disclosed embodiments relate generally to the field of speech analysis. In particular, the disclosed embodiments relate to a system and method for assisting language learning through use of speech recognition.

BACKGROUND

The business of teaching people to speak new languages is one that is expanding. Traditionally, people have learned new languages by taking courses with teachers and other students. Often, the goal of the courses is to teach proficiency in a specific new language, so that the students could travel to a foreign country, or have career advancement. For example, in countries such as Japan and Korea, demand for learning the language of English is high because Japanese and Korean companies value employees who speak English.

Over time, various forms of tutorials and guides have developed to help people learn new languages. In general, many of these past approaches have either required the presence of teachers, or they have required students to self-teach themselves. For example, students have performed listen and repeat exercises for themselves.

Various factors, such as globalization and the desire for people to travel have created a need for new and more sophisticated language learning tools.

Figure 1:
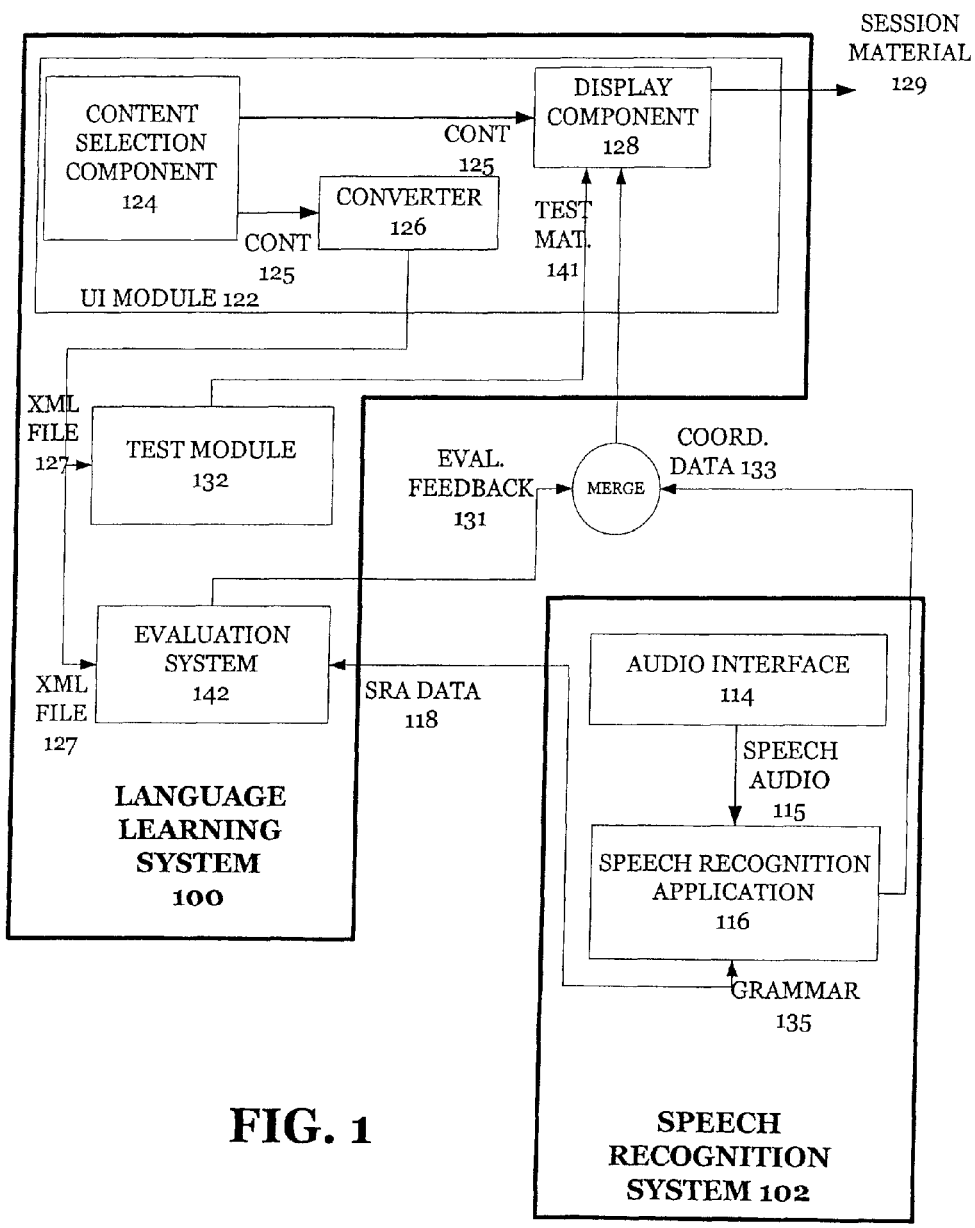
FIG. 1 illustrates a language learning system and speech recognition system combined, under an embodiment of the invention.

In the drawings, the same reference numbers identify identical or substantially similar elements or acts. To easily identify the discussion of any particular element or act, the most significant digit or digits in a reference number refer to the Figure number in which that element is first introduced. Any modifications necessary to the Figures can be readily made by one skilled in the relevant art based on the detailed description provided herein.

DETAILED DESCRIPTION

An embodiment described herein utilize the functionality of speech recognition systems to establish a programmatically implemented language learning system. Embodiments described herein evaluate speech and provide analysis, instructions and other forms of assistance for purpose of assisting the user in learning a new language.

Overview

According to one embodiment, speech data from the operation of a speech recognition application is recorded over the course of one or more language learning sessions. The operation of the speech recognition application during each language learning sessions corresponds to a user speaking, and the speech recognition application generating speech data. The text data may a recognition of what the user spoke. The speech data may comprise the text data, and confidence values that are an indication of an accuracy of the recognition. The speech data from each language learning session may be analyzed to determine an overall performance level of the user.

The term "speech data" means a combination of word values and confidence values. A word value is what the user is programmatically recognized as saying. Confidence values are values that indicate a reliability of the understanding. Thus, for example, the higher the confidence value, the more likely that that a computer-implemented program or process correctly recognized a spoken word of a user.

A "test" may include a structured or rule-based sequence of activities that require the user's participation for purpose of evaluation. The tests may be in the form of questions or prompts, to which the user is to provide verbal responses.

According to another embodiment, data from the operation of a speech recognition application may be recorded. The data recorded includes text data generated by the speech recognition application based on a recognition of what words the user spoke. One or more segments of the text data may be identified as a basis for at least a portion of a subsequent speech learning session.

A language learning session may correspond to any programmatic prompt and/or procedure in which the user is directed to perform action(s) that facilitate the learning of a language. A language learning session may be performed by a user in the presence of a speech recognition application, for purpose of evaluation and/or analysis.

One or more embodiments described herein may be implemented using modules. A module may include a program, a subroutine, a portion of a program, a software component or a hardware component capable of performing a stated task or function. As used herein, a module can exist on a hardware component such as a server independently of other modules, or a module can exist with other modules on the same server or client terminal, or within the same program.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holing data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

Architecture for Language Learning System

FIG. 1 illustrates a language learning system 100 that is coupled with a speech recognition system 102, according to an embodiment of the invention. The combined systems enable individual users to learn a non-native language by having their speech in the non-native language evaluated. In addition, embodiments of the invention may provide for the user to be given guidance or instructions for purpose of assisting the user in learning the new language. Numerous processes and functions for assisting users in learning the new language may be performed by the combined language learning system 100 and speech recognition system 102. These may include (i) evaluating the user's performance in speaking selected content in the non-native language; (ii) identifying words, syllables, phonemes, and word combinations that are problematic for the individual user; (iii) generating lessons and practice materials for the user, based on content that can include the identified problem areas; (iv) providing instructions and suggestions to the user; (v) maintaining a historical or composite scoring or evaluation about the user; and/or (vi) generating tests for the user to take in combination with the speech recognition system.

In one embodiment, the language learning system 100 and speech recognition system 102 are disparate systems that communicate with one another through application program interfaces or other similar means. For example, the speech recognition system 102 may be provided as part of MICROSOFT OFFICE XP, manufactured by the MICROSOFT CORPORATION. Another suitable speech recognition system may include DRAGON NATURALLY SPEAKING, provided by SCANSOFT, INC. Alternatively, an embodiment provides that language learning system 100 and speech recognition system 102 are provided as one integrated system. The language learning system 100 may prompt the use to speak, evaluate the user's speech and perform other functions to assist the user in learning to speak the new language. In addition, the language learning system 100 may provide a guide for the speech recognition application in following the non-native speaker. In turn, the speech recognition system 102 recognizes spoken words of the user. The accuracy of the recognition may vary, particularly when the speaker is not fluent. In an embodiment, the speech recognition system 102 also provides data and information for determining how accurate its recognition is. The language learning system 100 uses this data and information for purpose of evaluating the user's speech and performing other functions relating to assisting the user's learning of the new language.

Components of the speech recognition system 102 may include an audio interface 114 and a speech recognition application 116. The audio interface 114 includes elements for enabling the user to speak and interface with the speech recognition application 116. These elements may include a microphone and an interface (such as a driver). Speech audio 115 may be handled by the audio interface 114 and provided to the speech recognition application 116. The audio interface 114 may also include speakers (and a corresponding driver) for audio feedback (see for e.g. a test methodology under FIG. 7).

According to an embodiment, the language learning system 100 includes a user-interface module 122, a test module 132, and an evaluation system 142. The user-interface module 122 provides an interface for enabling the user to interact with the language learning system 100 during a language learning session. Among other functions, the user-interface nodule 122 may enable users to select or designate content for use with the language learning system 100. The user can read aloud from the selected content, and have his speech recognized by the speech recognition application 116. The evaluation module 132 may then evaluate the user's speech, as described in greater detail below. The selected or designated content may also be used by the test module 132 for purpose of generating one or more tests for the user. In one embodiment, the test module 132 communicates with the user-interface module 122 for purpose of forming test material (prompts and/or questions) based on selected or designated content.

User Interface Module

Components of the user-interface module 122 may include a content selection component 124, a converter 126, and a display component 128. The content selection component 124 enables users to select a text-based content 125 through use of their computer system. For example, the user may copy a web or word processing document and then paste it onto a window of the user-interface module that designates the copied content for use with the language learning system 100. In an embodiment shown, the converter 126 converts the content 125 into an XML file 127. The XML file 127 is passed to the evaluation system 142 and to the test module 132. In one implementation, converter 126 first converts content 125 from a native document format into a text format before generating the XML file 127. A display component 128 may also display session material 129 that is based on the content 125. The session material 129 may correspond to content 125 transformed with graphics and other functionality for purpose of assisting the user in reading the content out loud. For example, while the user is reading out loud, the session material 129 may provide a visual cue, such as a highlight or graphic on a particular word of the content 125 that the user is to read next as the user progresses through the content 125. In order to determine the progress of the user, the display component 128 may communicate with the speech recognition application 116 while the user is reading aloud.

An embodiment provides that the content 125 may originate from other sources as well. For example, the content may be transmitted to the language learning system 100 from an external source, or be provided to the user independent of a machine or computer system on which the language learning system 100 is operating. For example, as will be described in other embodiments, classroom-wide curriculums may be implemented based on embodiments of the invention. In such an embodiment, the content 125 may be streamed or broadcasted to individual users through a network. It may even be possible to provide the content 125 independent of the language learning system 100. The user may also type the content 125 in.

In an embodiment, session material 129 forms a basis of the user's interaction with the speech recognition application 116. Using the audio interface 114, the user may read and speak from the session material 129 for the speech recognition application 116. The evaluation system 142 may generate feedback data 131 that provides the user with information about how well he spoke or is speaking the session material 129. In one implementation, the evaluation represented by the feedback data 131 may include (i) on-the-fly evaluation or recently spoken words of the user, and (ii) an evaluation of the entire session material 129. At least some of the feedback data 131 may be provided from the evaluation system 142 to the display component 128, so that it appears with the session material 129. For example, while the user is speaking, some form of on-the-fly evaluation may be provided to the speaker. Upon completion of a session, the feedback data 131 may communicate the final evaluation of the user's performance. For example, the evaluation system 142 may generate a score, analysis, or other form of qualitative or quantitative feedback. The score or other evaluation provided by the evaluation system 142 may be displayed by the display component 128.

Additionally, the user interface module 122 may receive coordination data 133 from the speech recognition application 116. The coordination data 133 identifies what words the user most recently spoke. This data enables the session material 129 to contain visual cues that track the progression of the user speaking from the content. In an embodiment such as shown by FIG. 1, the feedback data 131 and the coordination data 133 are merged before being fed to the display component 128 of the user-interface module 122. The merged data synchronizes feedback data 131—particularly feedback data relating to on-the-fly evaluation of individual recently spoken words—with coordination data 133 relating to recently spoken words. The result is that the display component 128 can provide on the session material 129 visual cues that inform the user about his or her progression, continuity and/or performance, all while the user is still reading aloud a remainder of the session material 129. Thus, for example, a highlighted box or other form of visual cue may move with the user's progression through the session material 129, while simultaneously individual words that the user recently spoke may be color coordinated to reflect a score indication of how well the user was deemed to have spoken that particular word (or set of words). Additionally, other types of communications between elements of the language learning system 100 (such as prompts by the intervener 320 of FIG. 3) or the speech recognition system 102 may be provided through the user-interface module 122.

Evaluation System

According to one or more embodiments, the evaluation system 142 performs functions of evaluating the user's speech, providing or suggesting corrective actions, and guiding the speech recognition application 116. In an embodiment evaluation system 142 receives as input speech recognition application data (SRA data) 118. The SRA data 118 corresponds to data generated by the speech recognition application 116 in recognizing the speech audio 115. The SRA data 118 may comprise text-based data that is generated by the speech recognition system 102 and processed by the language learning system 100. Additionally, the SRA data 118 may include confidence values that indicate a measure of accuracy about the correspondence of the text data to the speech audio 115. As will be described, SRA data 118 may also include other forms of data, including (i) time values indicating when particular words or word segments were spoken in relation to one another (e.g. time value 214 in FIG. 2), and (ii) metadata indicating operation actions taken by the user or initiated by specific events (e.g. operation data 216 in FIG. 2).

The evaluation system 142 may also receive input from other elements of the language learning system 100. In an embodiment, the evaluation system 142 is provided XML file 127, or other text-based data generated from content 125.

In performing an evaluation of the user, the evaluation system 142 may consider several factors in evaluating the user's speech. These factors may include how accurately or easily the speech recognition system 102 was able to recognize the spoken words of the user (using, for example, the confidence values provided by the speech recognition 116 regarding its own accuracy), the cadence and timing of the user, and how often the user paused or if the user requested assistance. The evaluation system 142 may also evaluate the user by performing a comparison of what was recognized by the speech recognition 116 and what was supposed to be said by the user, as indicated by XML file 127 or other data provided based on content 125.

As described above, the evaluation system 142 may provide evaluation information in the form of feedback data 131. According to one implementation, the feedback data 131 is provided in several forms. The feedback data 131 may be provided on-the-fly, as individual words or sentences spoken by the user are recognized and evaluated. Upon completion of a session, the feedback data 131 may include an overall assessment of how well the user spoke in a particular session. The overall assessment may be qualitative or quantitative in nature (e.g. letter grade, score, LEXILE number). The overall assessment may also include suggested actions or instructions for the user to improve. After completion of the session, the evaluation, assessments, actions and/or instructions may be provided based on an analysis of the most recently completed session and past sessions of the user.

In an embodiment, the evaluation system 142 may also provide data and information to the speech recognition application 116 for purpose of aiding the speech recognition application to recognize speech from a speaker who is unfamiliar to the language he is speaking. In practice, individuals learning a new language make several mistakes when reading and speaking. Typical mistakes include repeating words or phrases (particularly words or phrases that appear just before a difficult word), stuttering a word, or not following text correctly and skipping lines. By itself, the speech recognition application 116 is not well equipped to handle such user mistakes and tendencies. To guide the speech recognition application 116, the evaluation system 142 may, based on the reference provided from XML file 127, generate a set of grammar 135 for the speech recognition application 116.

In an embodiment, the grammar 135 includes (i) a series of words or sentences that the user is required to speak as determined by the XML file 127, but not necessarily all the words in the content 125; and (ii) a set of rules or instructions that serve to model the typical mistakes and tendencies of the non-native language speaker. The rules instruct the speech recognition application 116 on how to detect and/or handle a user's mistake when it occurs. In one embodiment, the rules of the grammar 135 may be made in anticipation of the user's natural dialect, including mistakes and tendencies that are prone to persons of that dialect.

The exact form of the evaluation feedback, and additional functions of the evaluation system 142 are described in greater detail below and elsewhere in this application.

Test Module

In an embodiment, the language learning system 100 may be operated under a test mode. In the test mode, the test module 132 drives what the user is to speak. In one content, the test module 132 prompts the user to speak certain content based on rules or definitions of a test. The content of any test, referred to as test material, may be based on the content 125. One embodiment provides that the user-interface module 122 communicates the XML file 127 (generated from the content 125) to the test module 132. What the user speaks may be based on the test material. In certain implementations, some of all of the test material 141 may be communicated to the display component 128. The user's speech is then detected and processed by the speech recognition system 102. The test module 132 and the evaluation system 142 may also interact for purpose of scoring or evaluating the user's performance in taking a test from the test module.

Numerous types of tests are possible, and some of the tests are described in greater detail below. In one application, test module 132 generates a list of questions that the user must respond to verbally. The user's responses are detected and processed by the speech recognition system 102.

Alternatively, the test module 132 outputs a list of statements that the user must repeat. The statements may be based at least in part on test data 143 generated from the evaluation system 142. The evaluation system 142 may generate the test data 143 from the XML file 127. The statements may be presented to the user through the user-interface module 122, or presented to the user in the form of a synthesized voice outputted through the audio interface 114. Still further, the test module 132 may generate a fill-in test, where portions of a sentence, word or paragraph or displayed or played back to the user. The user's task in taking this type of test is to fill in the blanks with spoken words and/or syllables. The oral or verbal responses that comprise the test answers or responses may be processed by the speech recognition application 116, and then evaluated by the evaluation system 142 of the language learning system 100. A more detailed description of processes and methodology employed in connection with execution or operation of test module 132 is described with FIGS. 7-9.

In practice, a user may initiate a session using the language learning system 100 and the speech recognition system 102. Each session may be independently scored and evaluated. During a session, a user may select content through the user-interface 122, read the content aloud, and then be evaluated by the evaluation system 142. Alternatively or additionally, the user may initiate a more structured and rule-based interaction, as dictated by a test generated from the test module 132. In either case, the performance of the user in speaking aloud is evaluated and recorded. The user's performance in taking a test may be a more formal evaluation, such as required by a classroom or curriculum criteria.

Various applications are possible for a system such as described in FIG. 1. In particular, the user may utilize the language learning system 100 for more than one session, and maintain a history of his or her performance and evaluation results. For example, the user's performance level may be tracked over several sessions to monitor the user's improvement. If the user fails to improve sufficiently, the language learning system 100 may generate a notification to inform the user or a teacher that the user needs to practice more. As will be described, the language learning system 100 may maintain data that is specific to the user, including words, phrases, syllables, or phonemes that are problematic to the user. Furthermore, the language learning system 100 may be implemented for multiple users, such as, for example, to simulate a virtual classroom. These and other applications will be described in greater detail below.

Evaluation System

Figure 2:
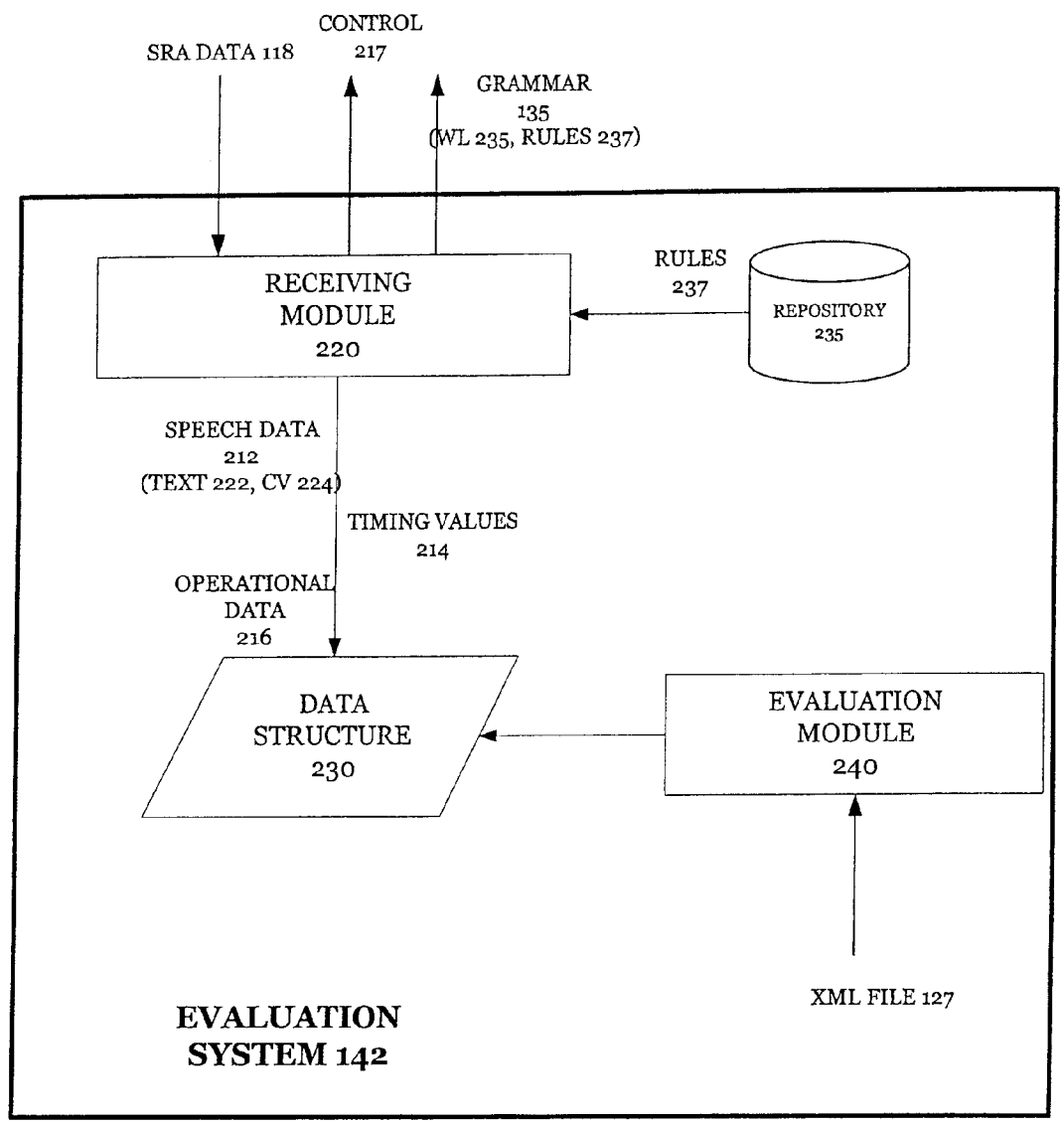
FIG. 2 describes elements that can be combined to form an evaluation system of the language learning system, according to an embodiment of the invention.

FIG. 2 describes elements that can be combined to form the evaluation system 142, according to an embodiment of the invention. The evaluation system 142 may include a receiving module 220, a data structure 230, and an evaluation module 240.

In one embodiment, receiving module 220 may establish communications and/or provide instructions or other control information for the speech recognition application 116. In particular, an embodiment may provide that the receiving module 220 handles SRA data 118 generated from the operations of the speech recognition application 116, and writes or otherwise cause this data to be stored in the data structure 230. If necessary, receiving module 220 may also forward the SRA data 118 to the evaluation module 240.

Additionally, receiving module 220 provides a means by which the evaluation system 142 may communicate, control and/or guide the speech recognition application 116. In particular, receiving module 220 may generate and/or signal the grammar 135 to the speech recognition application 116. The grammar 135 may include a word list 235, or other similar information, that conveys what words the user may try and speak and in what order. This word list 235 may be generated from the XML file 127 (or other data based on the content 125 that is to be used for session material 129). The word list 235 may act as a guide to the speech recognition application 116, so that even with a heavy accent, the speech recognition application is inclined to recognize the word correctly. According to an embodiment, the grammar 135 may also provide rules 237 (or instructions) that enable the speech recognition 116 to handle the user's mistakes in reading from the session material 129. The rules 237 may be devised to model mistakes of the typical user. For example, the rules 237 may provide instructions to assist the speech recognition application in detecting a stutter, or in detecting when the user is repeating words.

In one embodiment, a repository 238 may be used to retain and update the rules 238. The rules selected for any given speaker may be based on a profile of that speaker. The receiving module 220 may access the repository and implement rules and instructions based on the contents of the XML file 127. For example, the rules 237 may be configured to accommodate tendencies of the user's natural dialect (e.g. too fast). Thus, for example, rules for modeling mistakes and tendencies of Asians in speaking English may differ from the rules that assist Europeans in speaking English.

Among other functions, the receiving module 220 may also signal event-driven control information 217 to the speech recognition application 116. The control information 217 may be in the form of signals that cause the speech recognition application 116 to perform some action. In one implementation, the control information 217 is user-directed, to coincide with actions that generate operational data 216 (described below). In another implementation, the control information 217 may be responsive to specific events identified in the SRA data 118 (e.g. long pauses when the user is speaking, as described with FIG. 3).

In addition to its interaction with the speech recognition application 116, receiving module 220 may write the SRA data 118 to the data structure 230 and/or handle the SRA data for the evaluation module 240. According to an embodiment, SRA data 118 includes speech data 212, and a combination of related metadata that indicates additional information about the speech data 212 or the usage of the speech recognition application 116. The speech data 212 includes text data 222 that form words and sentences corresponding to what the speech recognition application 116 recognized. In particular, text data 222 may include segmented strings of characters that correspond to phonemes, syllables, words and phrases that the speech recognition application 116 recognized from the user's spoken words. The speech data 212 may also provide a confidence value 224 for individual segments of the text data 222. The confidence values 224 indicates a likelihood that a corresponding segment of the text data 222 is accurate-meaning that the segment actually matches what the user spoke. For example, in one embodiment, the confidence values 224 range from one to five, with five indicating the highest confidence.

In addition to speech data 212, an embodiment provides that the data generated by the speech recognition application 116 may include time values 214. The time values 214 indicate when segments of the speech data 212 were spoken. The time values 214 may be in the form of a time stamp, or other timing information that indicates when one speech data segment was spoken in relation to another speech data segment of a sequence.

Still further, an embodiment provides that the data handled by the receiving module 220 includes operation data 216. The operation data 216 may be generated by the speech recognition application 116 and/or from the user-interface module 122. The operation data 216 may be in the form of metadata that indicates specific operational actions undertaken by the user when operating the speech recognition application 116 and/or the language learning system 100. The user actions (e.g. "stop", "pause", "assist") may be taken through either the language learning system 100 or entered through the speech recognition system 102, in which case the receiving module 220 communicates the actions in the form of control information to the speech recognition application 116. The operation data 216 serves to record the user's actions, for purpose of better analyzing the user's performance during a session or even during a test. When operation data 216 is generated based on the user's actions, the operation data 216 may be received with corresponding time values 214. Specific examples of types of operation data 216 are provided as follows.

One action that the user performs is "record". In one embodiment, the action initiates the evaluation system 142 in compiling data for a new language learning session. Other specific actions that the user may perform in operating the speech recognition application 116 include the user selecting the command "say" to a particular word or phrase. The "say" action is an example of a command that instructs language learning system 100 (and/or the speech recognition system 102) to playback a specific word or phrase, using for example, a synthesized voice. The goal of this command is for the user to hear a correct pronunciation of the word. According to one embodiment, when the user selects the "say" command, the metadata records the command, the time value for when the command occurred, and the portions of the text data 222 that were subject to the command.

Another action that can be performed by the user is the command "play", which is an example of a command or instruction where the user can have the content 125 read back to him or her. The reading may be done in a synthesized or natural voice, by machine or by human (e.g. prerecorded). The purpose of this command may be to give the user a feel for how the session material 129 should sound when spoken correctly. In a classroom example, the "play" command may initiate a tutorial reading of a lesson, or inform a teacher that a particular student has requested a reading. Still further, another action that can be performed by the user is "listen", which is an example of a command or instruction where the user listens to his own recording of a particular content, lesson, or test. The user can initiate the command in order to listen to his own performance.

An embodiment also includes use of a command such as "explain" or "translate", as an example of commands where a user can select a specific word or text data segment for an explanation or translation. For example, once the user invokes the command, a selected word or phrase may be translated into the user's native language. The translated word may then be displayed to the user (such as through the user-interface module 120). Alternatively, a dictionary meaning of the word may be displayed, or the word may be shown in use with another sentence. The command illustrated by "explain" or "translate" may require the language learning system 100 to interface with a translation engine or dictionary application. In one implementation, the language learning system 100 may send the word to a translation engine on the Internet, and then return the translated word to the user. In another implementation, the language learning system 100 may send the word to an online dictionary and bring the dictionary meaning to the user.

Figure 4:
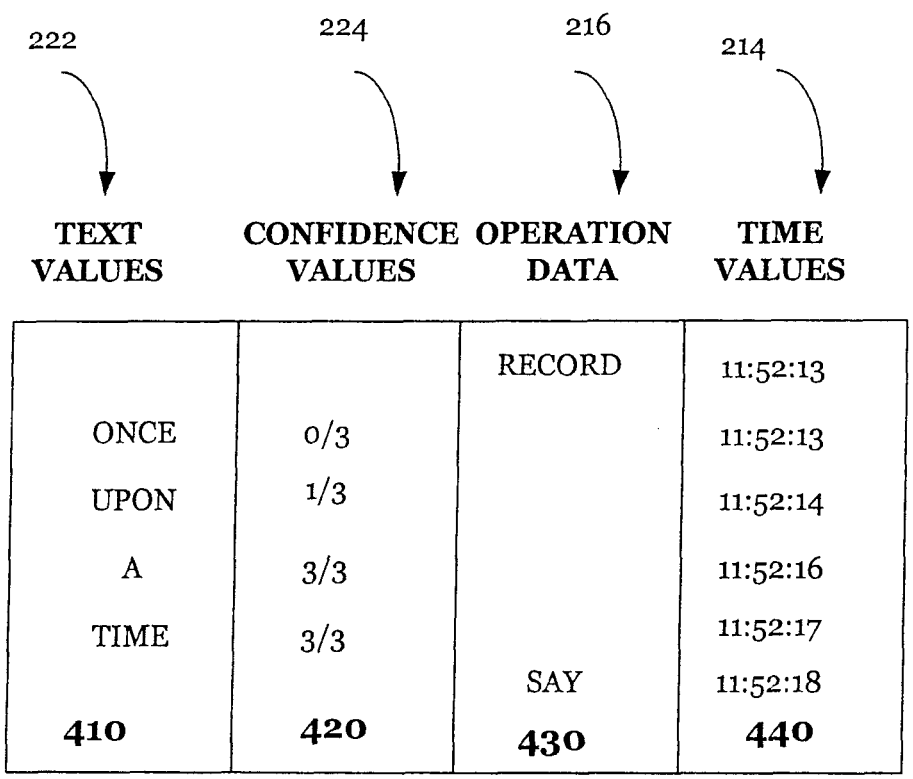
FIG. 4 provides a generic illustration of the contents of data structure for use with an embodiment of the invention.

As mentioned above, the speech data 212, time values 214, and operation data 216 may be handled by the receiving module 220 and recorded in the data structure 230. In one embodiment, the data structure 230 may correspond to a database table, and the receiving module 220 writes the data generated by the speech recognition application 116 into the table. An illustration of the contents of the data structure 230 is illustrated in FIG. 4. Among other uses, the data stored in the data structure 230 may be used to study a user's past performance, and to provide comparative basis for the user's progress. Evaluations of past and current performances may be provided to the user, such as in the form of a composite score or chart.

The evaluation module 240 may use the SRA data 118 to perform various processes relating to evaluating, instructing, correcting, and assisting the user in his or her language learning session. Additionally, the evaluation module 240 may have available to it some or all of the original content 125, such as in raw data or in the XML file 127. In one embodiment, a basis for the evaluation module's 240 analysis is confidence values 224 generated by the speech recognition application 116. The confidence values 224 generally correspond to the speech recognition application's own estimation of accuracy. The speech recognition application may have a value range (e.g. one to five) for each recognized word segment. If the speech recognition application provides the highest value as the confidence value for a particular segment of the speech data 212, the evaluation module 240 may interpret the corresponding confidence value(s) 214 as an indication that the user spoke the corresponding word(s) (or portions thereof) well. This indication would be based on the assumption that the speech recognition application 116 will perform more accurately the more fluently the user speaks. Conversely, if the confidence value for the word segment is low, the evaluation module 240 may interpret the confidence value as an indication that the user spoke the corresponding word(s) (or portions thereof) poorly, or with a heavy accent. This follows the assumption that one reason that the speech recognition application is not accurate is that the word was spoken poorly.

The evaluation module 240 may also perform its analysis and evaluation operations by referencing words that were recognized against words that were known to be contained in the session material 129. This may be accomplished by comparing the text data 222 of any given session to the word list 235 of grammar 135. However, an embodiment may provide for the speech recognition application 116 to be configured, or otherwise instructed, to focus problems in the user's speech in the generated confidence values 214. As described, grammar 135 may be used to configure or instruct the speech recognition application 116 using word list 235. If the user's pronunciation is off, rather than misrecognize the word with an inflated confidence value, the speech recognition application 116 may use the word list 235 to recognize the word correctly, but indicate the poor pronunciation in a lowered confidence value.

In performing an analysis or evaluation, the confidence values 224 of the user may be averaged, or statistically analyzed (distribution curve, median, etc.) and compared to a known or established standard. Values in between the highest and lowest values give lesser indications of the user's speech pattern, fluency and accent. In addition to confidence values, other data, such as time values 214 and operation data 216 may be used to perform an evaluation analysis on the user's speech. In one embodiment, the results of the analysis, whether based on any combination of confidence values 224, time values 214 and/or operation data 216, may be compared to a designated criteria or scoring system that can quantitatively evaluate the user. The evaluation may be based on the text data 222 and/or the confidence values 224 exclusively, or on other data, including a combination of the confidence values 224 and the time values 214 and/or operation data 216. As will be described in subsequent embodiments, the known or established standard may be empirically based, such as acquired from a sample group, or from numerous other users in a classroom setting. The user's own past performance values may also be used as a basis for the standards. Alternatively, the known or established standards may simply relay on the confidence values 224 and how the speech recognition application 116 values its own accuracy. But one advantage in using the time values 214 and the operation data 216 is that it provides a check or cross-reference to the speech recognition application's own estimation of accuracy. For example, sometimes, the speech recognition application 116 may be inaccurate, or deem itself to be inaccurate, for reasons other than how the user spoke.

As an addition or alternative, the evaluation module 240 may evaluate the user based on time values 214. In particular, the time values 214 may be used to evaluate the user's cadence in speaking, as well as the fluency of the user in speaking the non-native language. In one embodiment, the evaluation module analyzes the time values 214 for segments of the speech data 212 in order to evaluate the user's cadence. For example, the evaluation module 240 may identify the proximity in time as to when individual words in a sequence were spoken by the user. If the time between when adjacent words in the series is longer than what is identified as being normal, the evaluation module 240 may surmise that the user's cadence (and/or knowledge) is not proficient. The time values 214 may also indicate a long pause in between spoken words. In one implementation, the evaluation module 240 may seek the long pauses, and then locate segments of the text data 222 that follows the long pause. The evaluation module 240 may identify the word (or phoneme, syllable, or phrase) represented by that segment of text data 222 as a problem word. Still furthermore, a more sophisticated model may be used to model cadence and timing values of fluent speakers. The time values 214 recorded may be compared to such as model.

In one embodiment, the result of the analysis and comparison performed by the evaluation module 240 is a score or other quantitative indication. Various design parameters may be used to determine the score, including, for example, the performance level indicated by the confidence values, the cadence measurements as reflected by the time values, the detection of words that the user was deemed to have trouble with (as reflected by confidence values and time values), and the need by the user for assistance (as identified by the operation data 216, such as illustrated by "translate", "explain", "say", "listen" and "play"). The result of the analysis and comparison performed by the evaluation module 240 may also include a qualitative evaluation. For example, the user may be notified in written statements that her cadence was below average, or that she seemed to have particular trouble with the phoneme "th", but that her overall performance was high.

The user's qualitative and/or quantitative results may be recorded in the data structure 230. The evaluation module 240 may subsequently retrieve these results in order to provide composite scores and evaluations based on historical and current data for the user. For example, the user's performance score over several sessions may be averaged, weighted, or otherwise combined for purpose of evaluating the user over the course of the different sessions. Thus, for example, a careful evaluation of the user may be performed by gathering several samples of the user's performance. The samples may be evaluated in the course of a curriculum or schedule, such as, for example, a series of increasingly more difficult language learning sessions. In such a scenario, the user's score may initially start high and, with increase in difficulty, become lower. The user's skill level may be more carefully gauged using the composite scoring and evaluation.

By being able to record the user's score and evaluation after each language learning session, it is also easier to implement the language learning system 100 in a classroom setting, where the user is a student. As a student, the user may be evaluated for improvement and effort. A history of the user's performance, and combining scores and evaluations makes it easier to evaluate the student's overall performance in a curriculum.

In an embodiment, the evaluation module 240 may also identify problem areas in the user's speech. Specifically, the evaluation module 240 may evaluate the speech data 212, time values 214, and operation data 216 for purpose of identifying particular words, syllables, phonemes or phrases that the user has trouble with. In one embodiment, unusual pauses between words or syllables, as noted by the time values 214, are used to mark segments of the speech data that are problematic. For example, if the user pauses before a word, the speech data segment corresponding to that word may be marked as problematic by the evaluation module 240.

In addition to time values, certain words that were given poor confidence values 224 may be marked. In one embodiment, the evaluation module 240 may mark words that have low confidence values 224, and then inspect the content from which the speech data 212 was generated in order to identify what word was given the low confidence value. Still further, an embodiment may mark problem areas of the user through use of the operation data 216. For example, if the operation data 216 indicates the user required assistance with a particular word (e.g. through use of the "say" command or "translation"), the particular word may be marked. A combination of confidence values, time values and operation data may also be used to mark a problem word. For example, if a recognized word spoken by the user is detected as having an extended pause and a low confidence value, that word may be recorded as a problem word.

The evaluation module 240 may also provide personalized instructions and suggestions to the user in assisting the user to learn the language. For example, evaluation module 240 may identify words, syllables or phonemes that the user has trouble speaking, and then provides instructions or practice materials to assist the user in speaking those words, syllables or phonemes. For example, the instructions provided may include explanations or drawings of how the user should shape their mouth in making a syllable that was identified as being problematic to that user.

Figure 5:
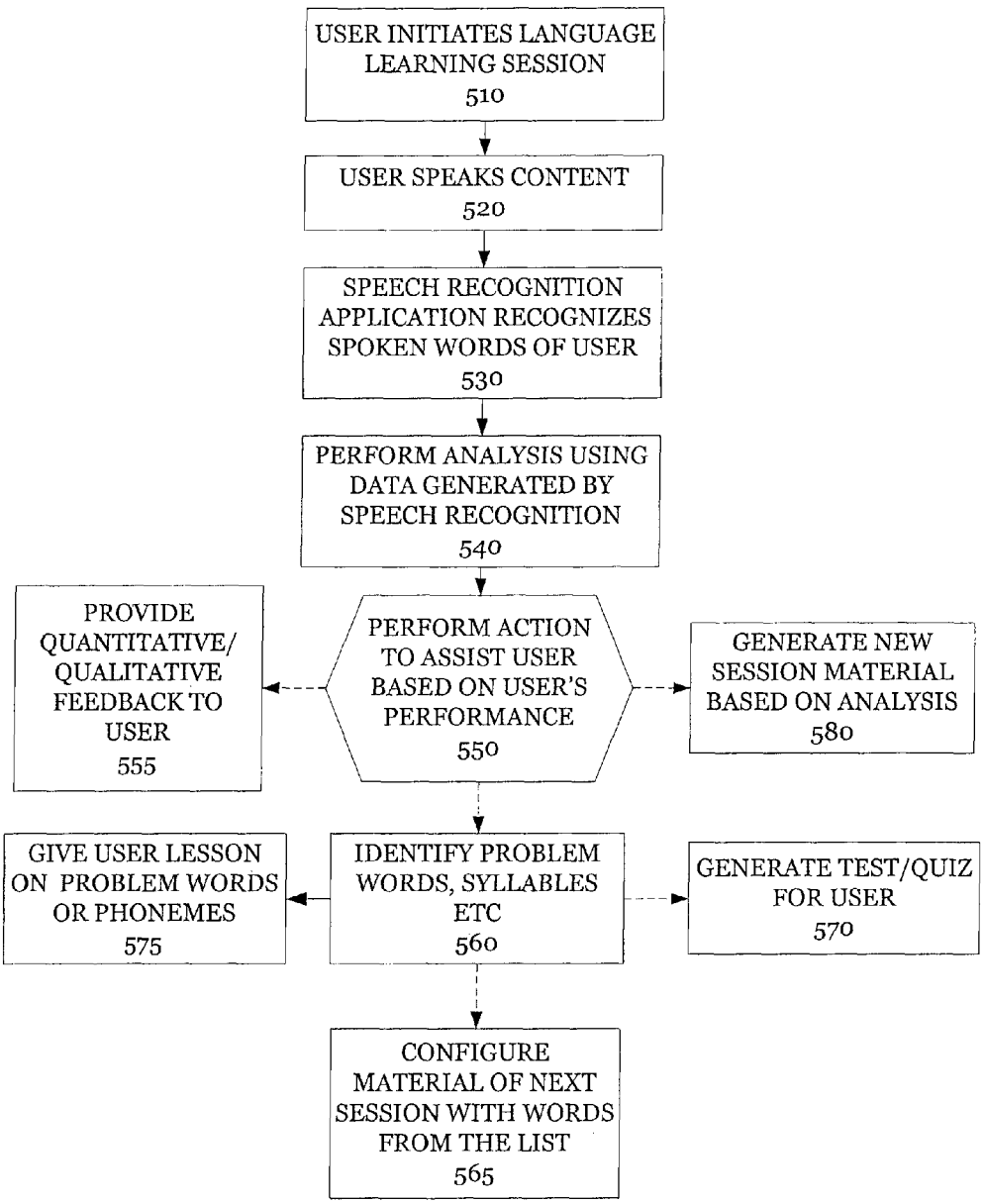
FIG. 5 illustrates a method for evaluating a user learning a new language through use of a speech recognition application, according to an embodiment of the invention.
Figure 6:
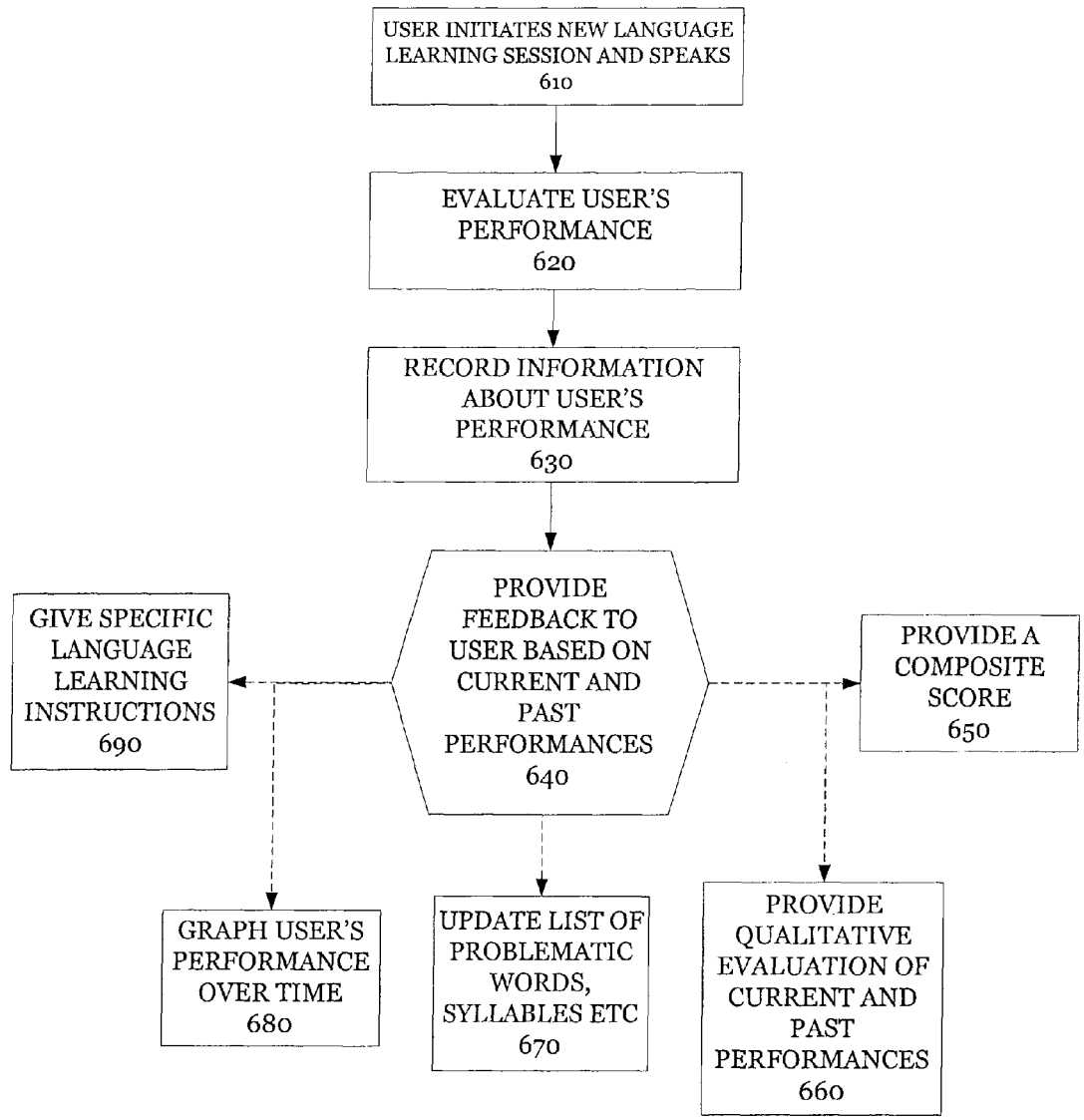
FIG. 6 illustrates a method for evaluating a user over the course of several language learning sessions, according to an embodiment of the invention.

A more detailed description of methodologies and processes employed by the evaluation module 240 or other components of the language learning system are detailed with FIGS. 5 and 6, and elsewhere in this application.

Receiving Module

Figure 3A:
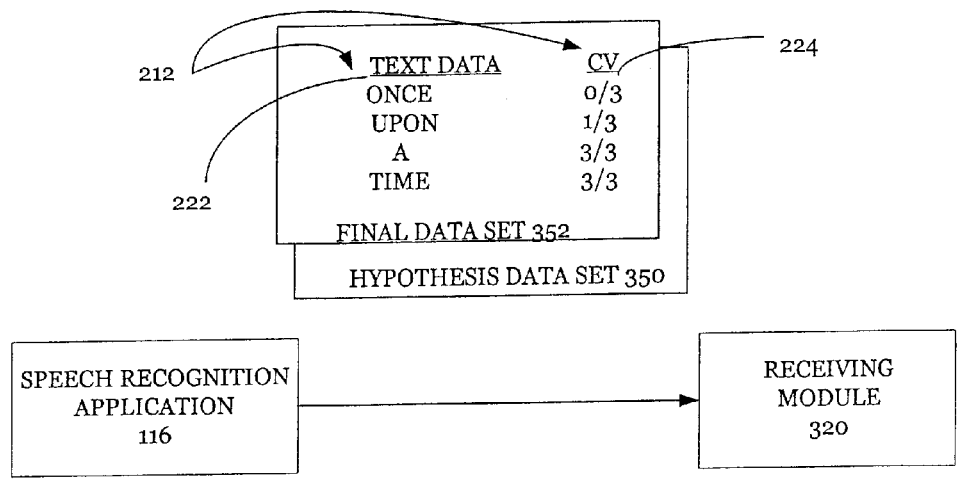
FIGS. 3A and 3B illustrate the operation of the receiving module in combination with the speech recognition application, under an embodiment of the invention.
Figure 3B:
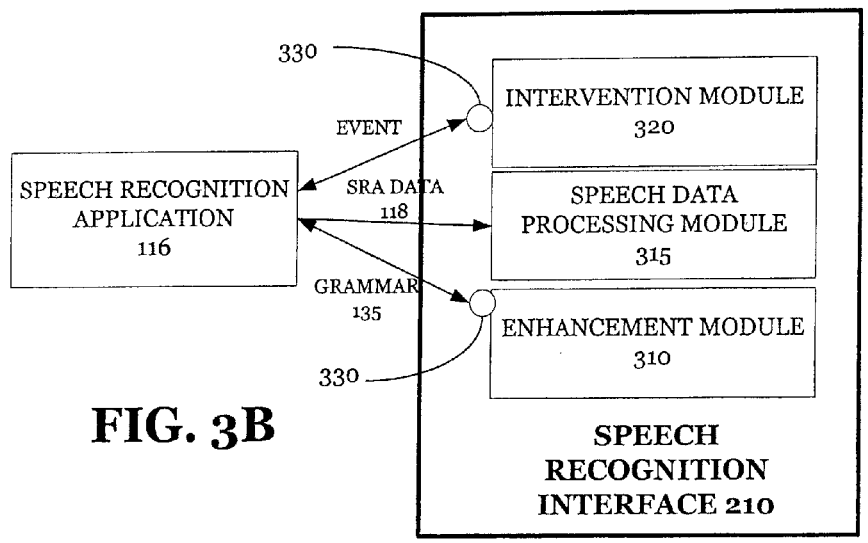

FIGS. 3A and 3B illustrate the operation of the receiving module 220 of the evaluation system 142, as well as the interaction between the receiving module 220 and the speech recognition application 116, according to one or more embodiments.

FIG. 3A illustrates the passing of SRA data 118 from the speech recognition application to the receiving module 220, according to an embodiment of the invention. The SRA data 118 generated by the speech recognition application 116 includes speech data 212. Components of the speech data 212 include text data 222 and corresponding confidence values 224. In the example provided, the text data 222 is a string of character data, segmented to correspond to "Once upon a time. . . . " The speech recognition application 116 is assumed to generate confidence values 224 that range between zero and three.

In an embodiment, two sets of speech data 212 actually comprise the SRA data 118. One set of speech data is a hypothesis, another set of speech data is a final result. While the user is speaking, recognized speech, in the form of speech data, may be generated as part of a hypothesis data set 350. At some point, such as after completion of a sentence, the hypothesis data set 350 is made into a final data set 352. However, even with grammar 135, the speech recognition application 116 may fail to recognize a word, or series of words. Failure to recognize a word or series of words may cause the speech recognition application 116 to not recognize entire sentence, or even an entire paragraph. When such failure occurs, the receiving module 220 may rely on the hypothesis speech data set 350, rather than the final data set 352. In an implementation shown, the final data set 352, not the hypothesis data set 350, may be sentence-based and thus more prone to failure. The hypothesis speech data set 350 may be used by the evaluation module 240 in order to evaluate the user. In this way, the user's evaluation is not dominated by the fact that the user failed to speak only a few words incorrectly.

In addition to speech data 212, other data and information carried by SRA data 118, including time values 214 (shown in FIGS. 2 and 4) and operation data 216 may be passed to the receiving module 220. In one embodiment, operation data 216 is generated by the speech recognition application 116 to correspond to certain actions that the user performs in operating either the language learning system 100 or the speech recognition system 102. Some operation data 216 may also be generated by the speech recognition system 102, and thus not transmitted from speech recognition application 116.

FIG. 3B illustrates additional interactions between components of receiving module 220 and the speech recognition application 118, according to an embodiment of the invention. The components include an enhancement module 310, a speech data processing module 315 and an intervention module 320. It is possible for the receiving module 220 to include a network interface 330 or port, for implementations in which the speech recognition application 116 and the evaluation system 132 are separated across a network such as an Ethernet or the Internet. In addition, a repository such as described in FIG. 2 may be used to store rules and instructions for use in generating grammar 135. The repository may or may not be part of the receiving module 220.

The enhancement module 310 includes processes that generate grammar 135, including the word list 235 and the grammar rules 237. As mentioned, a word list 235 portion of the grammar 135 may be provided from the content 125. The grammar rules 237 may be stored in repository 235. It is possible for the enhancement module 235 to select rules 237 from a larger library, depending on factors such as the type of speech recognition application in use, the natural dialect of the speaker, and the user's skill level. The rules 237 may be communicated to the speech recognition application 116 to enhance that component's operation. In particular, the speech recognition application's performance is enhanced in order to accommodate the mistakes and tendencies of users who are not native to the language being spoken.

In one embodiment, the grammar 135, and the rules 237 of the grammar in particular, are modeled after the typical tendencies and flaws of a user' speech. The rules may be specific to individual dialects and native languages. Example of grammar rules 237 include: (i) identification of when the user is repeating words in preparation of saying a difficult word; (ii) identification and handling of a stuttered word; (iii) indication of how certain words may be pronounced, based on the user's native dialect; (iv) ignoring certain words, such as words under four letters or the first words in sentence. In one embodiment, the enhancement module 310 may direct the speech recognition application 116 to recognize speech according to the following rules: (i) ignore words in the word list 235 that are three letters are less; (ii) allow for the user to skip a word, provided that (a) if the word appears more than once in the session material, the user has to say that word at least once, and (b) the user cannot skip a word that is the first word or last word in a sentence; (iii) a user can repeat a word, but not if it is the last word in a sentence, and not if it is a first instance of a word that is repeated in the text. Additional rules may be provided. In an embodiment, the rules may be individualized for a person's dialect and/or skill level.

In an embodiment, speech data processing module 315 receives the SRA data 118 from the speech recognition application 116. The speech data processing module 315 may write at least portions of the SRA data 118 into the data structure 230. The speech data processing module 315 may also forward the SRA data 118 to other components and elements of the evaluation system 142. In one embodiment, the speech data processing module 315 may implement one or more rules that are similar to the rules of the enhancement module 310 for purpose of filtering SRA data 118. The speech data processing module 315 may also register SRA data 118 as it is received, and generate coordination data 133 to enable the visual cues of the session material 129 to advance in coordination with the user's speech.

Another rule that the speech data processing module 315 implements is to substitute the hypothesis data set 350 for the final data set 352 in the event of certain conditions that indicate the final data set 352 is unreliable. In a case where the speech data for a particular word does not at all match what the XML file 127 indicates should be spoken, the speech data processing module 315 may inspect the hypothesis speech data set 350. The case may be that the final speech data set 352 was incorrectly processed by the speech recognition application 116. In such cases, the hypothesis data set 350 may provide a better guess as to what the user said. For example, in some situations, the speech recognition application 116 simply miscues with the speaker, and the intelligence of the speech recognition 116 worsens the recognition. In such instances, the hypothesis data set 350 may provide a more reliable recognition of what words the user spoke.

The intervention module 320 is an event-driven component, in that it intervenes the user's session to perform a task or operation upon the occurrence of the designated event. In one embodiment, the intervention module 320 has automated functionality that is responsive to certain data indicating the user requires assistance. For example, the intervention module detects the occurrence of when the user has paused for an unnatural length of time. Such a pause is assumed to correspond to the user being stuck on a particular word. The pause may be detected by the intervention module 320 monitoring the time values 214. When a pause is detected, the intervention module 320 may offer or provide assistance. The intervention module 320 may also cue off of user action, such as by detection certain operation data 216 (e.g. corresponding to "say"). Alternatively, the user may invoke the intervention module 320 through a command or operation.

There are various ways in which the intervention module 320 can provide assistance. In one embodiment, the intervention module 320 may inspect the speech data 212 to detect what word the user is having problems saying at the time stamp following the long pause. The intervention module 320 may then perform operation such as: (i) ask or prompt the user to request assistance; (ii) audibly pronounce the word, syllable or phoneme in question; and/or (iii) provide a translation or explanation of the word in question. Other forms of assistance are possible. The actions of the intervention module 320 may also be marked as operation data 216 in the data structure 230. For example, the word or phoneme that the user required assistance on may be recorded as a problem word for that user.

Data Structure for Storing Data

FIG. 4 provides a generic illustration of the contents of data structure 230, under an embodiment of the invention. The data structure 230 may be used to record SRA data 118 (see FIG. 1). In one embodiment, the data structure 230 includes two or more columns. A first column 410 provides text data 222. The text data 222 includes a character string that corresponds to a word or utterance recognized by the speech recognition application 116. A second column 420 provides the confidence values 224 for the text data 222 of the first column 410. The combination of the text data 222 and the confidence values 224 are the speech data 212. A third column 430 provides operation data 216 at instances (set by time values of column 440) when corresponding actions occur. A fourth column 440 provides the time values 214 (the timing value) for when that text data 222 or operation data 216 occurred.

Additional features may be incorporated into the data structure 230 as shown. In particular, results of the evaluation module 240 may be stored in one or more separate columns. The results may include performance scores, averages, past performance statistics etc. It may also be possible to input qualitative results in fields of the data structure. Hypothesis data (if it is not the data used) may also be maintained in the data structure 230. Additionally, different tables or structures may be used to maintain historical data.

By recording SRA data 118, one benefit provided is that the user may be evaluated over the course of two or more language learning sessions. Different functions and operations that can be performed to assist the user in learning the language using historical and current data are illustrated with embodiments described with FIG. 6, and elsewhere in the application.

According implementations and embodiments in which multiple users interact with a language learning system, data such as illustrated with FIG. 4 may be recorded and maintained for each user. For example, multiple users may provide data that is recorded into multiple tables. The data may be recorded into the tables from over a network connection to each of the student's individually. In a context such as the implementation of a curriculum or course, recorded data from all of the users may form a basis for evaluating each student individually, and for defining performance based parameters. For example, each student's performance may be evaluated against the performance of other students who undertook a comparable language learning session, or against historical records of other students who participated in similar language learning sessions.

Evaluation Methodology

FIG. 5 illustrates a method for evaluating a user learning a new language through use of a speech recognition application, according to an embodiment of the invention. Reference to numerals of other figures is made to illustrate suitable elements for implementing a step of embodiment.

In step 510, a user initiates a language learning selection. In reference to an embodiment such as shown by FIG. 1, the session may start with the user selecting content 125 and having the user-interface module 122 prepare session material 129. As described with FIG. 1, it is possible for the user to select his or her own content from a web article or other resource. But the content being read may also be designated, such as through a classroom curriculum.

Step 520 provides that the user speaks for the speech recognition application by reading out loud the select or designated content. The user may speak into a microphone or other device (e.g. audio interface 114 in FIG.) that can interface with a computer system on which the speech recognition is provided.

In step 530, the speech recognition application generates data from what the application recognizes the user is saying. As mentioned with previous embodiments, the recognition may correspond to speech data 212, which includes text data 222 representing recognized words or portions of words and confidence values 224 indicating an accuracy of the recognition. Time values and/or operation data 216 may also be provided from the data generated by the speech recognition application.

In step 540, one or more analysis operations may be performed using the data generated by the speech recognition application for purpose of evaluating the user's performance during the session. In one embodiment, the analysis may be based on an evaluation of speech data 212, time values 214, and/operational data 216.

Components of Analysis Operations

The analysis of the speech data 212 may focus on the confidence values 224 and corresponding text data 222. According to one embodiment, the confidence values 224 of each recognized word in the user's speech may be averaged, and possibly weighted for one or more conditions. Other statistical analysis may also be performed, including: (i) acquiring the median of some or all of the confidence values, (ii) identifying a band gap in the statistical values, and/or (iii) using a histogram. Numerous other forms of analysis may be employed for analyzing confidence values, such as curve-fitting.

As an alternative or addition to performing analysis operations using confidence values 224, the analysis may include quantifying a correlation between the text data recognized by the speech recognition application and the text of the content spoken. With reference to FIG. 1, since the selected content is computerized and text-based, it can be provided to the language learning system 100 as a point of comparison for the text data 122. However, correlation between the text data 122 and the text of the content used for speaking may only indicate that the speech recognition application performed well.

The analysis of time values 214 may focus on averaging the amount of time between recognized words, syllables or phonemes. In one implementation, the normal range of time that passes between words of a native or fluent speaker of the language may be used as a comparison point in analyzing the time values of the speaker. The number of instances in which the user took too long to say a word may be aggregated. Alternatively, the time between each of the user's spoken words, or just those spoken words in which the time values exceed a certain amount, may be statistically analyzed (e.g. averaged, histogram, media, band gap etc). Pauses in between syllables of a word may also be detected and analyzed as an indication that the user had trouble with the word.

In one embodiment, the operation data 216 indicates when the user sought assistance. The type of assistance the user sought may be valued differently. As described with previous embodiments, operation data 216 may indicate when the user performs some task or operation in the language learning session. Some tasks or operations described with embodiments of the invention include (i) the user requesting a word to be spoken or repeated, (ii) the user requesting an entire passage to be spoken or repeated, and (iii) the user requesting an explanation or translation of a word. For example, the user's performance may be more devalued if the user requested the speech recognition application to say a trouble word, than if the user requested a native language translation or explanation.

On-the-fly analysis operations may be performed using methodologies described above. The on-the-fly methodology may perform the analysis operation while the session is ongoing. Thus, with reference to FIG. 1, while the user speaks from session material 129, words and/or sentences already spoken are evaluated for the user. With reference to FIG. 1, the result of these analysis operations may form the basis of feedback 131, which is used by the display component 128 to render results of the evaluation operations on the session material 129. In one embodiment, the focus for the on-the-fly operations may be based on the confidence values 224 and perhaps the timing values 214. The evaluation may also be performed on individual words or sentences, rather than on an entire passage of the session material 129.

In addition, the analysis operations may be performed after the session has been completed. This analysis operation may be more comprehensive, taking into account the various types of data, including operation data 216. Once the session is complete, the analysis operation may also incorporate a historical or trend component for the individual user (described in greater detail with FIG. 6). In one embodiment, the overall analysis of the user may be based on a combination of speech data, time values and operation data. A formula or algorithm maybe implemented in which values from the analysis of each data is weighted, or accounted for, in determining a result of the evaluation. For example, a situation may exist in which the speech data 212 indicates the user spoke very well, but the time values 214 indicate the user spoke deliberately and slowly. In this instance, the feedback would not indicate the user had performed well. Likewise, there may be a case in which the analysis of the speech data 212 may indicate the user did not speak fluently, but the time values 214 indicate his cadence matched that of a fluent speaker, and the operation data 216 indicates the user required no help. In such a situation, the user may receive a high valuation, even though the speech data by itself did not support the high valuation.

While an embodiment described uses a combination of speech data 212, time values 214, and operation data 216, other embodiments may provide for analyzing the user's speech using just one type of data, or using each type of data independently. For example, the user's analysis may be based on just speech data 212, or time values 214 only. Alternatively, the user may be evaluated on all three types of data independently, so that the user's feedback includes separate entries from the analysis of each type of data.

Based on an analysis of the data generated by the speech recognition application, step 550 provides that one or more actions or operations may be identified in order to assist the user in learning the new language. FIG. 5 provides different examples of these actions or operations, according to one or more embodiments of the invention. Steps 555-585 provide examples of actions that can be performed under step 550.

In step 555, the action performed includes providing the user qualitative or quantitative feedback of his or her performance. The quantitative feedback may be in the form of a score, such as a number or letter grade, that indicates the user's overall performance. In one embodiment, the user's score may be based on a standard, such as a LEXILE standard, or based on empirical information from scores achieved by other users who have the same native language. The qualitative feedback may be in the form of statements or impressions made to the user. For example, a statement may be displayed to the user that states "You did well, but you need to pronounce the "th" phoneme more clearly, and your cadence was slow." The user may be given an impression by, for example, changing the color of some of all of the session material 129 (see FIG. 1) to indicate the user spoke that material well or poorly.

Steps 560-575 indicate actions that correspond to the evaluation including identification of problem words, syllables or phonemes of the particular user. In step 560, words, syllables or phonemes that were problematic to the user are identified. These items may be identified through use of speech data 212, time values 214 and operation data 216. For example, long words that have low confidence values may be flagged when using speech data. Timing values 214 may be used to detect words, syllables and/or phonemes immediately following a long pause. Operation data 216 may be used to identify words that the user requested assistance on.

Steps 565 and 570 suggest alternative corrective actions that can be performed in order to facilitate the user in learning the problem words. Step 565 provides that new session material (see element 129 in FIG. 1) may be generated that highlights, emphasizes, or otherwise incorporates the trouble words. Thus, for example, if the user is determined to have trouble with the phoneme "th", session material may be generated in the form of a "th" tongue twister. Similar to session material, step 570 provides that a test or quiz is generated for the user. The test or quiz may require the user to speak words that include the identified trouble spots. Alternatively, for example, the user may be prompted to provide a translation or explanation of a problematic word.

Steps 565 and 570 may be performed at later times than when the analysis of the user's performance occur. For example, the session material that emphasizes the user's problem words or phonemes may be constructed for the user the next time he initiates a language learning session. The quiz described in step 570 may be performed without notice on the user, hours or days later. For example, the user may be sent a word to speak aloud on his cell phone, where the word is an identified problem word.

Step 575 provides that the user is given specific instructions relating to the problem word, syllables or phonemes. For example, the user may be given instructions on how to anatomically position elements of the user's mouth in pronouncing certain words or portions of words. The user may also be given instructions on how to improve his or her cadence, based on the results of the time values. The instructions provided to the user may be part of a database that is referenced in relation to the identified problem words or word segments and time values.

To facilitate performance of steps 560-575, a list of problem words, syllables, and phonemes may be maintained for the user. For example, with reference to FIG. 2, the list may be maintained in the data structure 230. With the completion of each language learning session, the evaluation system 142 (or other element) may update the list. For example, there may be a determination that the user did learn to speak a troubling word, and then that word would be removed from the list.

Following step 550, step 580 provides another example of an action that can be performed based on the user's performance. The action may correspond to adjusting a skill level of a subsequent session material to the performance level of the user. For example, if the user's performance level is too high for the session material selected, the next session material can be altered or configured to be more difficult.

FIG. 6 illustrates a method for evaluating a user over the course of several language learning sessions, according to an embodiment of the invention. A system such as described in FIGS. 1-4 enables a user's progress and performance level to be tracked. This provides several benefits. For example, the user can see how she is improving over time, and the language learning system has the ability to maintain sustained and individualized instructions for the particular user based on a large amount of data about the user, and in particular, on historical data.

Step 610 provides that the user initiates a new language learning session and speaks. This step may be performed similar to steps 510 and 520 of the method illustrated with FIG. 5. The assumption in describing the method is that this is not the user's first language learning session, and data from the user's past sessions is maintained and available.

In step 620, the user's performance for the current language learning session is analyzed based on data generated by or from use of the speech recognition application 116. As described in FIG. 5 and elsewhere in the application, the analysis may be based on data that includes speech data, time values, and operation data.

Step 630 provides that information about the user's performance is recorded. For example, the information may be stored in data structure 230 of FIG. 2. In one embodiment, the information recorded may include raw form of speech data, time values and/or operation data. In another embodiment, the information stored in includes processed data, such as qualitative or quantitative results of the current session. Still further, one embodiment may provide that what is recorded is only metadata, such as operation data or the fact that the user completed the session.

In step 640, feedback is provided to the user that communicates the user's performance over the current and past sessions. Thus, the feedback does not just rely on one session's data, but data from multiple sessions. This allows improvement in the user's language level to be reflected. Additionally, if the user has an errant performance, the result of that performance will not skew the overall measurement of the student's proficiency and language development.

Numerous functions and operations may be performed in order to provide the user feedback based on the user's performance in current and past sessions. The particular functions and operations described in the following may be implemented by one or more embodiments of the invention.

In step 650, the user may be provided a composite score of their performance level in the language being learned. The composite score is a valuation that considers or reflects both past and present performances of the user. The manner in which the composite score may be derived is an issue of preference. For example, the composite score may weight more recent performances in deriving a single value. The use of composite scoring is useful because scoring the user over several performances provides more data and sampling points for evaluating the user's performance.

In step 660, the user may be provided a qualitative evaluation that considers present and past performances. The qualitative evaluation may serve to instruct the user, or provide an impression to the user of his performance over current and past sessions.

As described in previous embodiments, a list of problematic words, phonemes, or syllables may be maintained for an individual user. Step 670 provides that this list is updated. While the list may have one set of contents from a previous session, the list may be updated to remove a particular item after a current session and/or to add new items. For example, as the user's proficiency grows, the user may learn words or word segments that were previously problematic. A current session may confirm that the user has learned words that were previously determined as troubling to him or her. But with advancement, new more difficult words may be flagged as being troubling to the user. Maintaining a list of problem words and word segments may be useful in this way, as the list may be maintained to be focused on the user's current skill level.

Step 680 provides that a graph or other visual form of feedback is shown to the user about their performance over the course of the language sessions. The graph may be in any form, including bar or pie chart.

Step 690 may provide that the user is given specific language learning instructions on words or word segments that are deemed to be problematic to that user. In one embodiment, words or word segments that are repeatedly determined as being problematic are addressed with specific instructions. For example, over the course of several language learning sessions, a determination may be made that the user has trouble with the phoneme "th" or with the word "there". The user may be given instructions on saying the word, such as through audible samples of the word being spoken through a computer. The user may also be provided with instructions on how to form his mouth's anatomy in making the "th" sound. Alternatively, instructions provided with step 690 may include tips on other aspect's of the user's speech, such as cadence or fluency. For example, the user may be instructed to slow down his speech, or to pause when encountering a comma.

Testing Methodology

In an embodiment, test are structured or rule-based language learning sessions, where when and/or what the user speaks is determined by rules of the test. Additionally, in an implementation, tests may carry special significance when evaluated. For example, the user's performance in a test may be assumed to be that user's best performance. In classroom settings, such as described in later embodiments, a user's response to tests provides a primary basis for evaluating that user.

With reference to FIG. 1, tests may be implemented through a combination of the test module 132 and evaluation system 142. The role of the test module 132 may include (i) generate test material, (ii) prompt the user to provide responses in a manner dictated by rules of the test. When verbally provided, the responses may be evaluated by the evaluation system 142, such as described by other embodiments of the invention.

Figure 7:
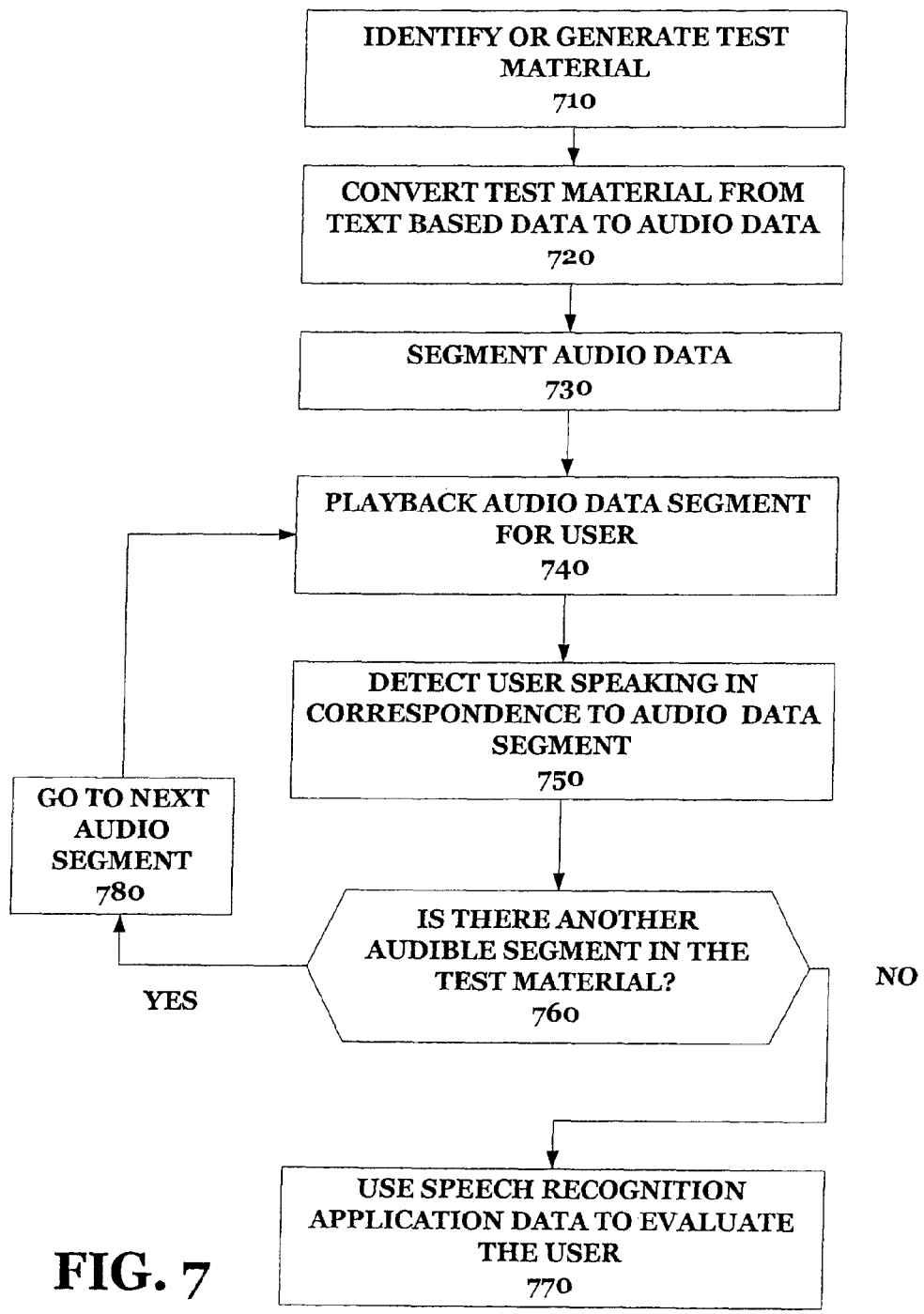
FIG. 7 illustrates a method for implementing a first type of test in which the user is to listen and repeat an audio segment, under an embodiment of the invention.

FIG. 7 illustrates a method for implementing a first type of test in which the user is to listen to an audio segment, and then speak for the speech recognition application 116. Initially, step 710 provides that the test material that is to be used is identified or generated. In one embodiment, the user may select content for the test material. For example, in an embodiment shown by FIG. 1, the user may select any text based content using content selection component 124. The content selection component 124 may then provide the content in the form of XML file 127. Alternatively, the content and/or the test material may be set. For example, in later embodiments, a teacher or implemented of a curriculum may designate the test material.

In step 720, the test material (assuming it is text-based) is converted into audio data. A text-to-audio conversion application may be used. This functionality may be incorporated into the speech recognition application 116.

Step 730 provides that the audio data is segmented into one or more segments. For example, the audio data may be segmented to reflect the sentences of the original content that was used to form the test material.

In step 740, one of the audio segment is played back for the user. For example, initially, the first sentence of the test material may be played back to the user. The user then repeats what he heard.

What the user speaks is then detected in step 750. For example, the speech recognition application may detect the user in correspondence to an audio segment that was previously played back to the user.

In step 760, a determination is made as to whether there is another audible segment in the converted test material. If there is another audible segment remaining, step 780 provides that the next audible segment is retrieved. The method is then performed again from step 740.

If no more audible segments remain, then the determination is that the test has finished. Step 770 provides that the user's verbal responses are evaluated. With reference to an embodiment of FIG. 1, the SRA data 118 generated by the speech recognition application 116 in response to the user speaking is a basis of evaluation. The evaluation may be based on factors such as pronunciation and cadence, as described in previous embodiments. In particular, the text data 222 portion of the SRA data 118 maybe compared to the text of what the user was prompted to speak. This correlation may form one part of the user's evaluation. Another part of the user's evaluation may be based on the confidence values 224. In an implementation, the higher the confidence values of correctly stated words, the higher the user is evaluated. Additionally, the time values are analyzed to incorporate the user's speech rate into the valuation.

A test such as described with FIG. 7 may test both the user's speaking abilities and the user's comprehension, under the assumption that comprehension is needed in order listen to the audible statements and to remember the statement when repeating it.

Figure 8:
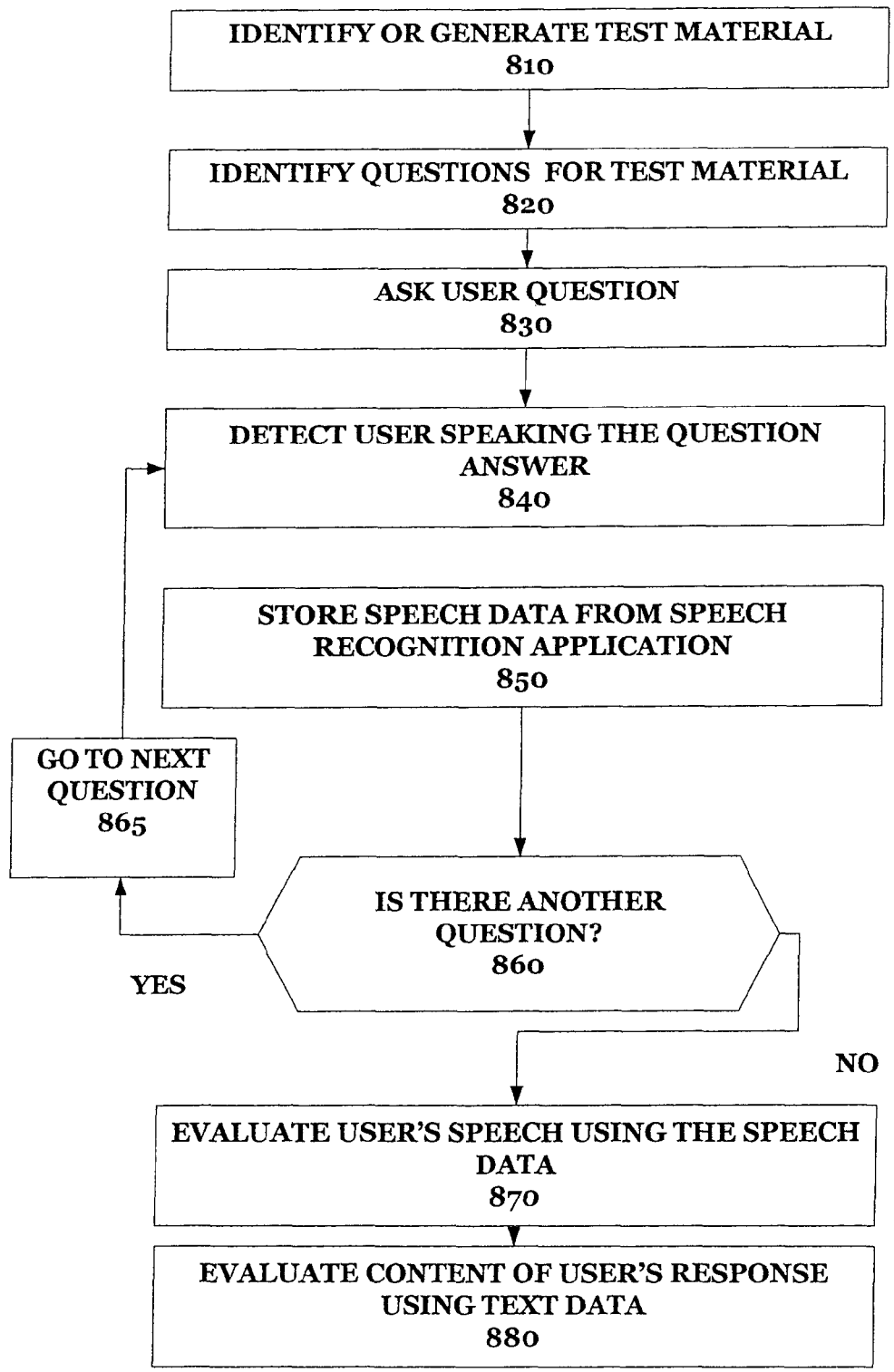
FIG. 8 illustrates another method for implementing a second type of test in which the user is to be prompted to provide verbal answers to questions, under an embodiment of the invention.

FIG. 8 illustrates another method for implementing a second type of test in which the user is to be prompted to provide verbal answers to questions, under an embodiment of the invention. A method such as described with FIG. 8 may be performed substantially through programmatic means, such as through a system described in FIGS. 1-4. Thus, programming and code may be used to perform many of the steps described. Initially, step 810 provides that a test material is identified or generated, as described with step 710 of the method of FIG. 7.

Questions that are to comprise some or all of the test material are identified in 820. In one embodiment, both the test material and the questions are provided from an external source, such as a human instructor. In another embodiment, the test material is identified from content selected by the user (see e.g. content selection component 124), and questions that are to comprise the test materials are programmatically identified from the selected content. For example, a library of programming or other computer-implemented instructions may be used to identify specific information about the selected content, such as who the author of the material is (programming identifies author), or what is the pertinent location of the article (programming looks for names of geographic regions). Still further, the questions may be generic and independent of the particular material. For example, one question asked may be to describe what the content is about.

In step 830, the user is asked a question from one of the identified questions of step 820. The question may be displayed to the user, or converted into an audible that is played back to the user. In an embodiment such as shown by FIG. 1, step 830 is performed by the test module 132. At least some of step 820 may also be performed by the test module 132.

Step 840 provides that the user speech in speaking the answer is detected by the speech recognition application. This may be done through use of an audio interface (such as described by element 114) and speech recognition application 116. For this type of test, the answer provided by the user is not a repetition of the question.

In step 850, data generated by the speech recognition application is stored. In particular, text data and corresponding confidence values are stored.

In step 860, a determination is made as to whether there is another question in the test. If the determination is that there is another question, step 865 provides that the next question is retrieved. The method is then performed from step 840, using the next retrieved question. If no additional questions remain, then step 870 provides the user's speech in speaking the answers to the questions is evaluated. This may be done using one or more of the speech data, the time values and the operation data, as described with other embodiments provided herein.

As an option, step 870 provides that the content of the user's response is evaluated. In one embodiment, the text data may be inspected to determine if the answer provided by the user contains words or phrases that are also contained in a model answer. In another embodiment, a programmatic comparison may be performed between the text data of the user's answer and the content of the model answer. Still further, the content of the user's answer may be manually reviewed. For example, the user's answers may be transmitted over a network such as the Internet to another individual who is an instructor. The other person may then evaluate the quality of the user's answers.

A test such as described by FIG. 8 may be used to evaluate a user's comprehension and fluency, as the user has no cue to what the verbal response should be. Furthermore, the user must comprehend the question and provide an answer that, at the very least, has identifiable words. As such, a test such as described in FIG. 8 has particular application in a curriculum or classroom setting. Such settings are described with FIGS. 11 and 12.

Figure 9:
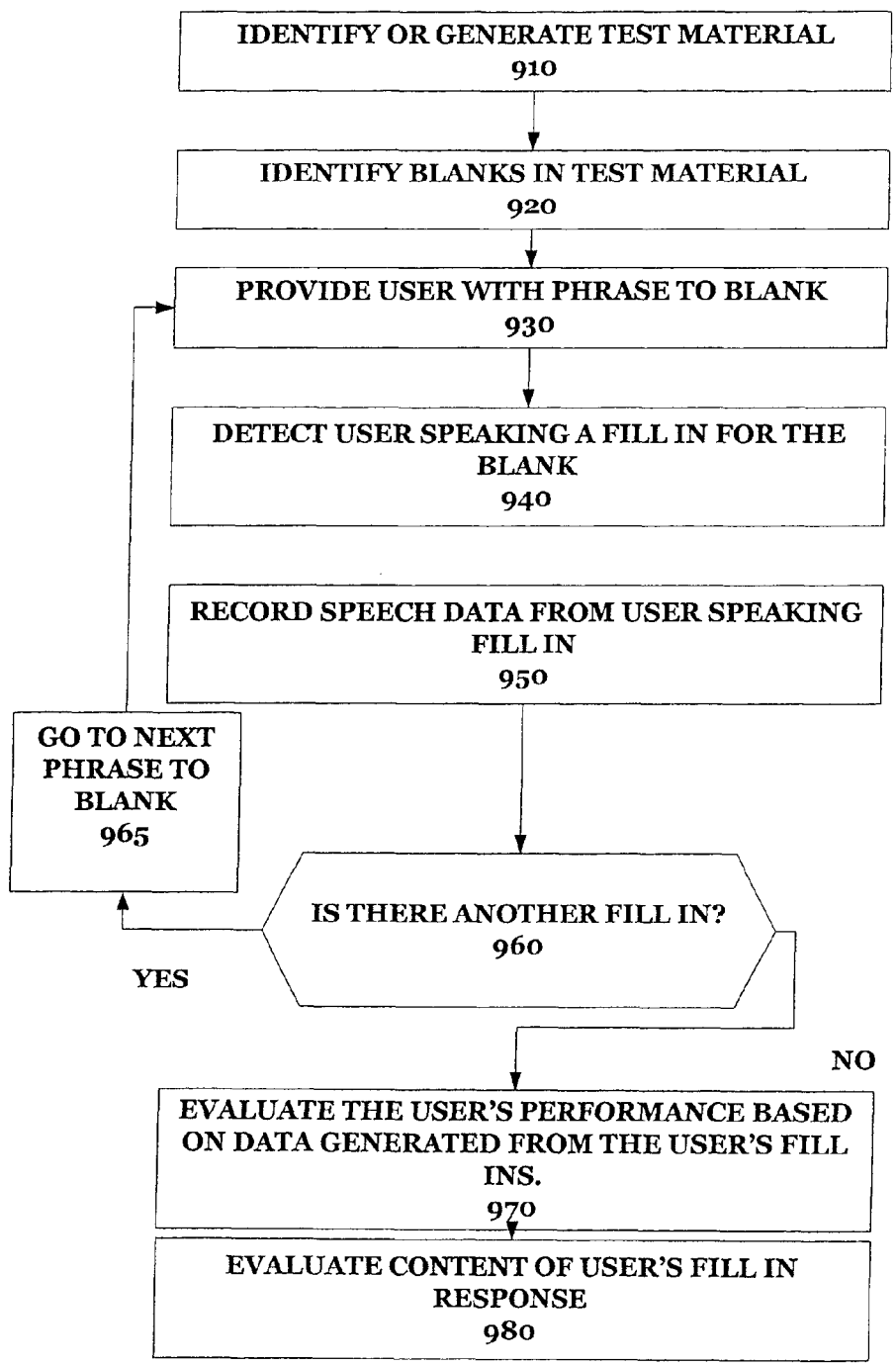
FIG. 9 illustrates another method for implementing a third type of test in which the user is provided a phrase and prompted to complete a portion of that phrase.

In one embodiment under FIG. 1, the test module 132 in combination with the speech recognition application 116 may prompt the user's verbal response and record what the user speaks. The evaluation system 142 may then evaluate how the user spoke from the test materials. FIG. 9 illustrates another method for implementing a third type of test in which the user is provided a phrase and prompted to complete a portion of that phrase. A method such as described with FIG. 9 may be performed substantially through programmatic means, such as through a system described in FIGS. 1-4. Thus, programming and code may be used to perform many of the steps described.

Initially, step 910 provides that a test material is identified or generated. The content that is the basis of the test material may initially be selected. Under an embodiment such as shown in FIG. 1, the user may operate the content selection component 124 to select this content. The text data from the selected content may then be converted into an XML file that can be processed into test material by the test module 132. Alternatively, the test material or content that is to form the basis of the test material may be provided to the test module 132 of the language learning system 100.

Step 920 provides that the test material can be configured to contain fill-in blanks Once test material or content is provided, an embodiment such as provided with FIG. 1 may provide the test module 132 to include code or other programming means to convert the content into phrases that run into blanks.

In step 930, the user is provided with a phrase that runs into a blank. In one embodiment, the text data that comprises the phrases up to the blanks is translated into audio data and played back for the user. At the same time, the sentence up until the blank may be displayed to the user. A prompt, such as a pause or visual indication (e.g. blank line) may signal the user to provide a fill-in.

In step 940, the user is detected as speaking in response to being prompted. The speech recognition application 116 may pick up the user's speech and generate corresponding data that includes speech data (text data and confidence values) as well as time values.

Step 950 provides that the speech data from the user speaking the fill-in is recorded.

Then in step 960, a determination is made as to whether there is another fill-in blank for the user in the test material. If there is another fill-in blank, then step 965 provides that the phrase until the next fill-in blank is retrieved. The method is then repeated, starting from step 930, where the phrase until the next fill-in blank is outputted (audio and/or display) for the user. Otherwise, the test may be completed, and step 970 provides that the user's performance is evaluated using the data generated by the speech recognition application 116 when the user provided the fill-in. In addition to text and confidence value, time values of when the user spoke in relation to being prompted to provide the fill-in may be recorded. The ability for the user to rapidly respond to a fill-in prompt is an indication of comprehension and fluency.

As an option, step 980 may provide that the content of the user's fill-in is evaluated, either programmatically or manually. In an embodiment under FIG. 1, the test module 132 may be configured to compare text data corresponding to the user-fill ins with the text data from the actual original content that was removed to generate the test. The comparison may be performed programmatically by the test module 132 in order to evaluate the user on content. In such an embodiment, the evaluation system 142 may be used to evaluate how the user spoke the fill-ins, as well as the time of response for the user. All of these factors provide a basis for understanding the user's performance level with the language.

Language Learning System Implementations

A language learning system such as described in embodiments above may be implemented in numerous settings and for various applications.

Figure 10A:
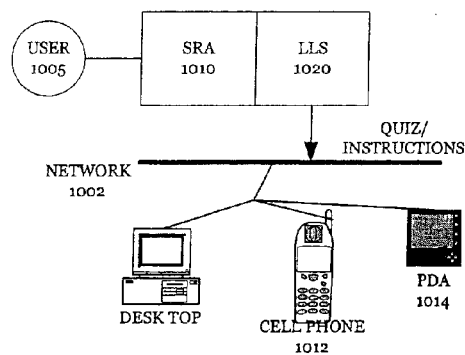
FIGS. 10A-10D illustrate different settings and implementations for one or more embodiments of the invention.

FIG. 10A illustrates a standalone or one person implementation in which a user 1005 may operate a language learning system 1020 in cooperation with a speech recognition application 1010, in a manner described with embodiments of the invention. For example, the combined systems may reside one computer operated by the user. FIG. 10A illustrates a feature in which the user may operate the language learning system 1020 to provide himself with instructions, practice material and quizzes or tests. These instructions, practice materials and quizzes/tests may be transmitted or carried over to other computer platforms and devices under the control of the user. The particular platform or operating system in use with the device may be accounted for programmatically by an interface application executing on the user's machine or with the language learning system, as well as possibly with the device that is to receive the communications. An example of a suitable interface applications includes ORB software, manufactured by ORB Networks, Inc.

In one embodiment, the user 1005 may transmit himself a quiz of practice material on his cell phone 1012. For example, an Short Message Service (SMS) email may be sent to the phone containing a word and a phonetic pronunciation of the word. This transmission may act as a prompt to assist the user to say the word correctly to himself. The transmitted word may be one that was identified as being problematic to the user, from previous language learning sessions, as described earlier in the application. Alternatively, the language learning system 1020 may call the user on his cell phone, using an interface application such as described.

The user may also synchronize a PDA 1014 and carry practice material and lessons with him. It may also be possible to carry the language learning system 1020, or at least material for generating a session, onto the PDA 1014. The user may participate in the session using the PDA. In one embodiment, user's evaluation may occur when the user perform another synchronization and transfers the SRA data 118 to the larger computer.

Figure 10B:
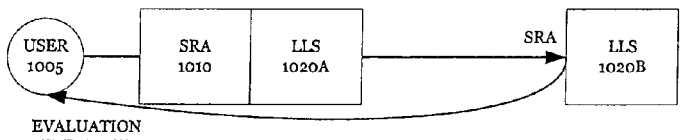

FIG. 10B illustrates a combined language learning system 1020 and speech recognition application 1010 that are distributed across a network 1002 such as the Internet. In the implementation shown, the language learning system 1020 is distributed across the network 1002 as portions 1020A and 1020B. For example, with reference to an embodiment of FIG. 2, components such as the receiving module 220 may reside locally, while data structure 230 and evaluation module are provided as a service across the network. For this example, FIG. 10B illustrates evaluation feedback being sent to the user from the network site of the language learning system portion 1020B. It should be noted that while the evaluation feedback may be transmitted via network communications, the case may also be that the evaluation feedback is sent via regular mail, or communicated via telephone.

Figure 10C:
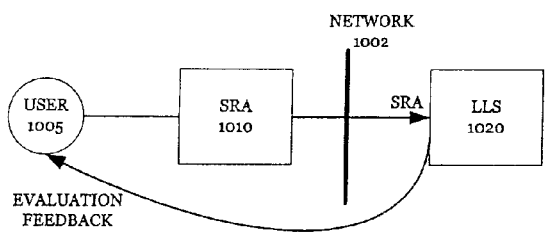

FIG. 10C illustrates a similar implementation where the language learning system 1020 is a network service. A user may access the service and use his or her own speech recognition application 1010.

Figure 10D:
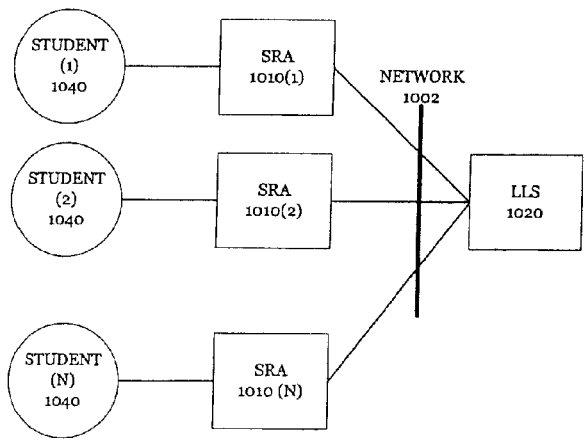
Figure 11:
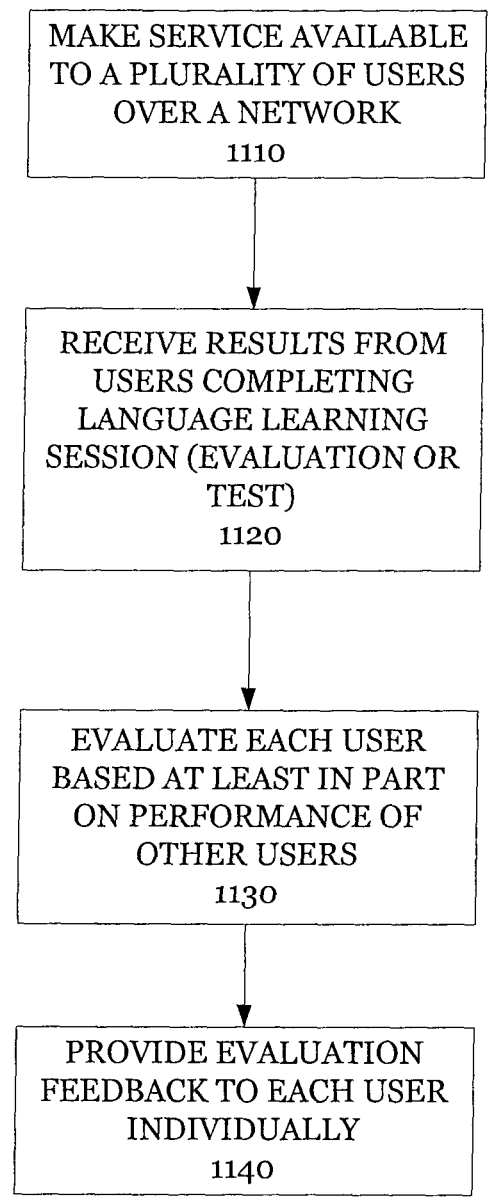
FIG. 11 illustrates a method in which multiple users may access and use a language learning service using a network, under an embodiment of the invention.
Figure 12:
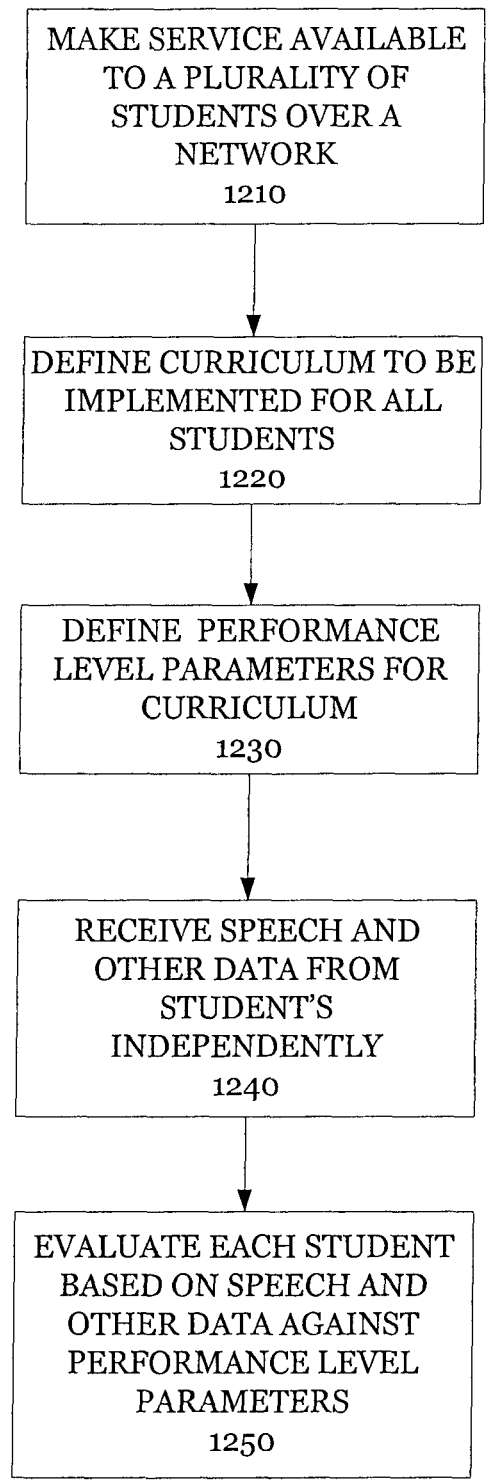
FIG. 12 illustrates a method for implementing a curriculum or course in a virtual classroom or course, under an embodiment of the invention.

FIG. 10D illustrates a scenario where multiple users access the language learning system 1020 over network 1002. A usage example for such an implementation is shown by FIGS. 11 and 12. For example, in FIG., the plurality of users may be students participating "virtually" in a course to learn a new language. For example, the users may comprise students from different parts of the world who want to learn English.

In either of case shown by FIGS. 10C and 10D, it should be noted that the case may also be that both of the speech recognition application 1010 and the language learning system 1020 may be provided over the network. Additionally, even with a network service, an embodiment provides communications (such as practice materials or problematic words) to different devices of the user, such as one user's cell phone.

Classroom and Curriculum Implementation

As shown by FIG. 10D, embodiments of the invention may be implemented in the form of a network service offered to multiple users. FIG. 11 illustrates a method in which multiple users may access and use a language learning service using the Internet or some other network. In step 1110, the language learning system 100 (see FIG. 1) may be configured to serve multiple users from over a network. Depending on the case or usage, each user may be provided the same content, or user's may select their own content. User's may access the service at their own time, from any location where they reside. Foe example, user's from different countries, such as Germany and France, may access the same service in order to learn English.

Step 1120 provides that results are received from users who complete a language learning session. The language learning session completed by individual users may be in the form of a test or evaluation. In some instances, the same content or test may be used by all of the users. In other cases, the content used by individual users may be different, and to each user's selection or preference.

In step 1130, each user is evaluated from data that is generated by the speech recognition application of that user (or for that user, if the speech recognition application is network-side). With reference to FIG. 1, SRA data 118 generated for the user may be evaluated based at least in part on criteria, standards, or other factors determined by the performance of other users of the same service. For example, a set of users may share the service and be determined to be relatively of the same skill level in the language being learned. The overall performance of any one user may be determined in part by the performance of other users who are in the same skill level.

Step 1140 provides that feedback may be provided to each user individually. Thus, the feedback may account for weaknesses or strengths of that particular user. For example, a set of foreign students from different countries in the world and who wish to learn English may comprise the users of the language learning service. While each student may be deemed to have the same proficiency in speaking English, each student may have a different native language, and thus a different dialect. Words and mis-pronunciations by one student from, for example, Japan, will not be similar to words and mis-pronunciations from a European student. Each student may thus need personalized instructions to accommodate their own dialect.

An embodiment of the invention may operate a language learning system such as described above in a classroom setting, where a curriculum may be followed. The curriculum may define standards of performance, and initiate requirements from its students. These requirements may include, for example, how many hours the students are to use the language learning service, how much the students must listen to and engage the feedback, specific content that the users must learn to speak, and tests that the user must complete and perform satisfactorily on.

In one implementation, an embodiment of the invention may be provided in a traditional classroom that is equipped with one or more computers for its students. The computers may operate a system such as described in FIGS. 1-4, either by locally operating the language learning system or accessing it through a network. In another implementation, a system such as described by FIGS. 1-4 may be implemented for a virtual classroom. In the latter implementation, the virtual classroom may be in the form of a service, such as illustrated by FIG. 10D. In the virtual classroom, an actual teacher may or may not exist. If one does exist, communications between the teacher and the students may be through the network, such as through voice-telephony, by email, or instant messaging. In either case, the usage of the language learning service or system, such as how often the service is used and what tests the user must take, may be defined by the curriculum.

Accordingly, FIG. 12 illustrates a method for implementing a curriculum or course in a virtual classroom or course, under an embodiment of the invention. A virtual classroom or course may refer to a group of similarly skilled students following the same curriculum by using the language learning system from over a network.

Step 1210 provides that the service is made available to a plurality of students over a network. It is assumed that the students designated into classes of comparative skill, at least initially.

In step 1220, the curriculum, including the performance requirements, the standards used, and the expectations from the students, are communicated to the students.

In step 1230, speech data 212, time values 214, and operation data 216 are received from each student independent, as that student completes a language learning session. In one embodiment, the data received from the students include evaluations of content that the user selected for his or her own session. In certain cases, such as the administration of a test (such as described in FIGS. 7-9), the content provided to each student may be the same. The time that each student takes the test may also be set by the service.

In step 1240, the students may each be independently evaluated. As mentioned above, each student may require personalized instructions. For example, students from different regions of the world may require different forms of assistance in learning the new language. Each student may partake in multiple language learning sessions, and the results and scores of each student may be tabulated over time and compared to other students. The comparison provides empirical information as to how one student is performing and learning based on the performance of the other students. Thus, for example, at the completion of the curriculum, each student may be provided a composite score in the form of a grade. The grade may account for numerous past performances of the user, particularly on tests (see FIGS. 7-9). Attendance may also provide a component of the overall grade. The attendance may correspond to the number of hours the user participated in the language learning sessions, which may be indicated by operation data 216 and other metadata.

Even thought the students may participate in a classroom setting, individualized instructions may be provided to each setting. In an embodiment, the individualized instructions may be provided programmatically. For example, as described with previous embodiments, a list of problem words or word segments may be separately maintained and updated for each student.

User-Interface and Case Examples

Figure 13A:
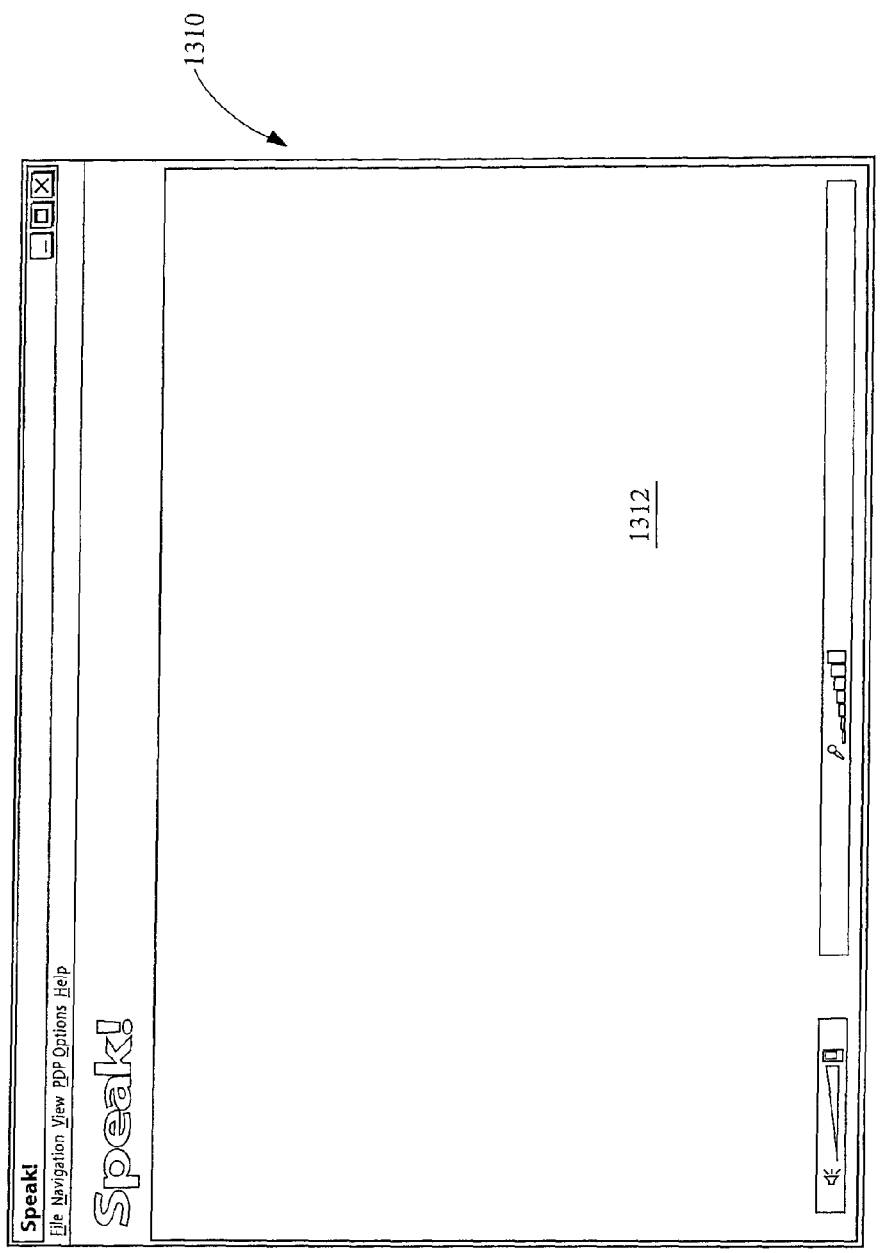
FIG. 13A-13C illustrate a user-interface and a case scenario implementation of an embodiment of the invention.
Figure 13B:
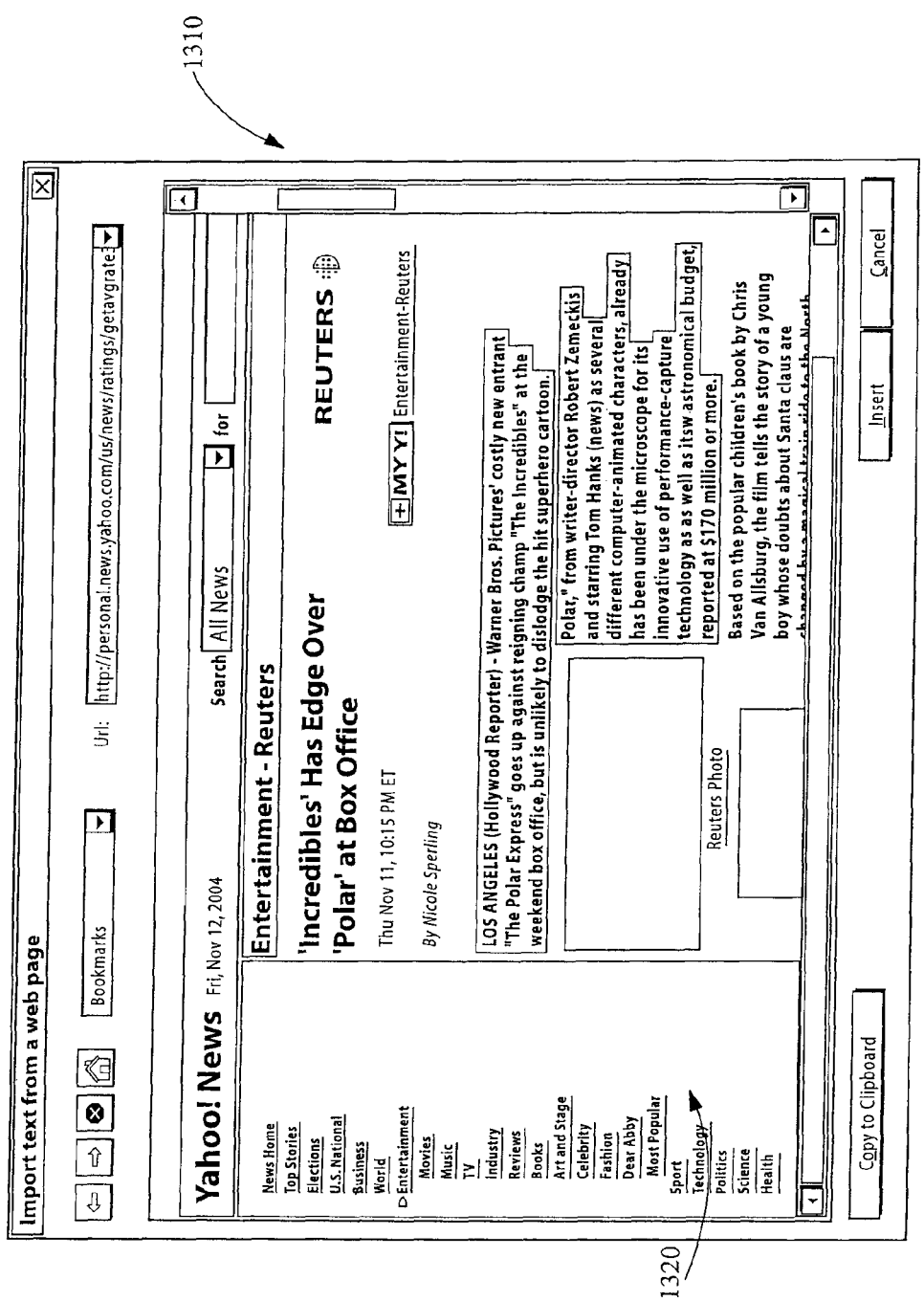
Figure 13C:
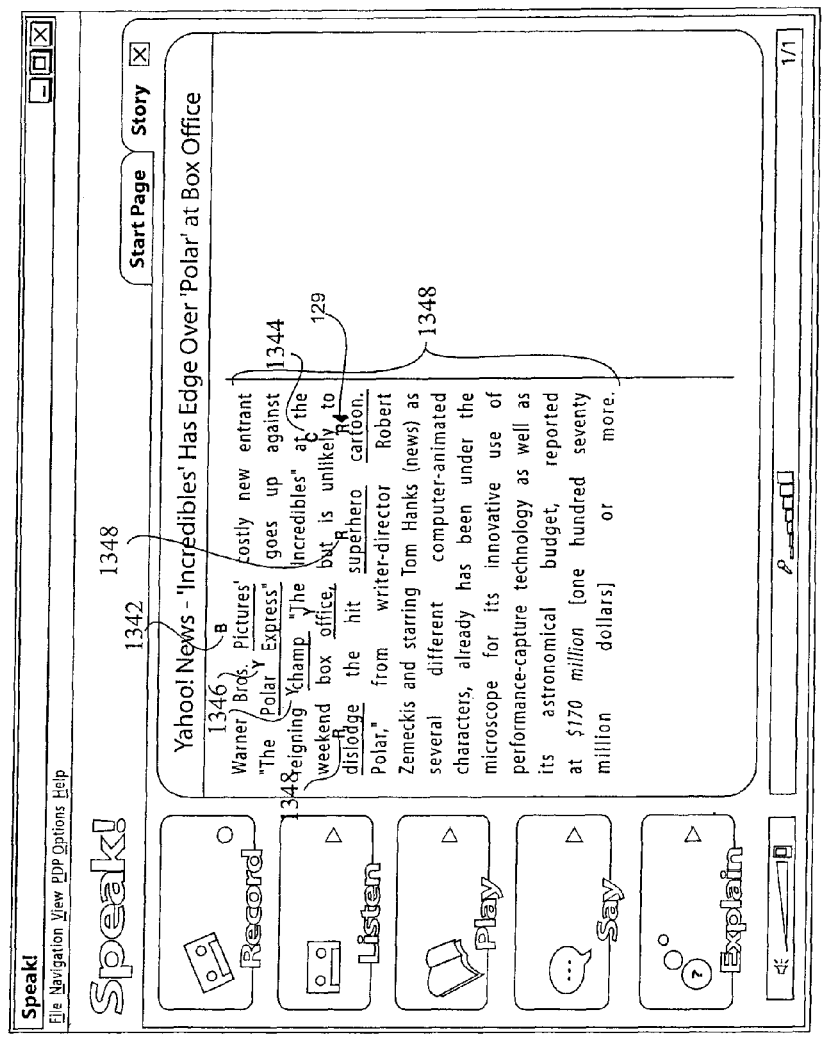

FIGS. 13A-13C illustrate a user-interface and case example, according to an embodiment of the invention. Reference is made to elements of FIG. 1 for purpose of describing a context for a user-interface such as shown by FIGS. 13A-13D. In particular, a user-interface 1310 may be generated and maintained by display component 128 or other element of user-interface module 122.

In FIG. 13A, user-interface 1310 is shown an initial state. A window 1312 is provided for interacting with content selection component 124. A user may select any text-based content for inclusion in window 1312.

FIG. 13B illustrates a user selecting web-based content for inclusion in the window 1312. The content may be imported into the window in any one of numerous ways. For example, the user may, as show, copy and paste the web content onto the window 1312. Alternatively, the user may open a browser 1320 through the window 1310, or execute some other import function.

FIG. 13C illustrates a language learning session that is in progress. Session material 129 is provided within the window 1310. Prior to the user reading aloud, the session material 129 corresponds to the text content of the content selected with FIG. 13B. Once session material 129 is generated, one or more prompts 1330-1340 are provided. Each prompt 1330-1340 may be in the form of an icon or other selectable user-interface feature. A user may select a prompt 1330-1340 in order to cause the language learning system 100 and/or the speech recognition system 102 to perform one or more operations. The operations shown correspond to operations that are identified by operation data 216, as described in FIG. 2 and elsewhere in this application. When any of the prompts 1330-1340 are selected, an embodiment provides that a time stamp is generated along with metadata (e.g. operation data 216) indicating the action occurred.

In an implementation such as shown by FIG. 13C, a first prompt 1330 may be selected to initiate a "record" action. The record action will start trigger the speech recognition system 102 to start recording the user's speech. This means that the content has been selected, and that the user is ready to start reading session material 129.

A second prompt 1332 may be used for a "listen" command. This operation may be selected in order to cause the language learning system 102 and/or the speech recognition application to playback the user's own recording. A third prompt 1334 may be assigned to a "play" command, in which the language learning system 100 and/or the speech recognition system 102 to generate a synthesized or tutorial playback of the session material 129. A fourth prompt 1338 may be assigned to a "say" command, in which the language learning system 100 and/or the speech recognition system 102 may pronounce a word, phrase or syllable for the user. A fifth prompt 1340 is used to signal the language learning system 100 to perform an "explain" operation, where the system retrieves a translation, definition or other explanation of a word.

FIG. 13C illustrates a case where the user has spoken a portion of the session material 129 and then actuated the second prompt 1332 to perform a "listen" command. The "listen" command initiates automated playback for the user of the session material 129. Prior to selecting the command, the user received evaluation feedback from the evaluation system 142 indicating how he spoke from the session material 129. In one implementation, the evaluation feedback may be provided through color coordination. For example, four colors may signify the user's performance level, on a word-by-word basis. Black may indicate well spoken, green may indicate moderately well spoken, yellow may indicate poorly spoken, and red may indicate unacceptable or unintelligibly spoken. In the example provided, the black words correspond to a majority of the session material 129. A specific example or a black word 1342 is "Pictures". An example of a green word 1344 is "unlike." An example of yellow words 1346 are "Polar Express" and "office". The red words 1348 include "dislodge" "superhero" and "cartoon".

In one embodiment, thee color coding evaluation may be based primarily on confidence values. For example, the following table may be implemented:

TABLE 1

| | |
|---|---|
| CV > 80% | BLACK |
| 70% > CV > 80% | GREEN |
| 50% > CV > 70% | YELLOW |
| >50% | RED |

Wherein the color designates how a spoken word will appear in the session material 129, and the score will designate the confidence value range for that color. The specific values recited are only examples. Furthermore, the values recited may be adjusted based on the country or natural dialect of the user, as well as the user's skill level.

The color coordinated wording is just one example of responsive or on-the-fly feedback. As mentioned, this feedback may be provided from evaluation system 142, via the merged feedback data 131 and coordination data 133. In addition to responsive feedback, a final evaluation may be provided. This evaluation may be in the form of, for example, a letter grade or LEXILE number. The final evaluation may also incorporate scores from previous sessions, as described in previous embodiments.

CONCLUSION

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A method comprising:
   presenting text on a computing device to guide a user to speak a language as part of a language learning session;
   detecting, by the computing device, words spoken by the user in the language;
   generating speech data representative of a recognition of the words spoken by the user, wherein the speech data comprises one or more confidence values, an individual confidence value indicating a likelihood that the computing device correctly recognized a correspondence between at least one word spoken by the user and at least part of the text presented on the computing device; and
   evaluating the one or more confidence values to calculate a performance result for the language learning session.

2. The method of claim 1, further comprising:
   receiving, via one or more networks, one or more previous performance results for one or more prior language learning sessions for the user; and
   determining, based on the performance result for the language learning session and the one or more previous performance results for the one or more prior language learning sessions, an overall performance level of the user speaking the language, wherein the one or more prior language learning sessions are performed by the user on at least one computing device other than the computing device.

3. The method of claim 1, further comprising sharing the text amongst multiple computing devices communicatively linked across one or more networks, each computing device of the multiple computing devices being associated with a participant in the language learning session.

4. The method of claim 3, wherein the text is part of a curriculum.

5. The method of claim 4, further comprising administering the language learning session as part of a test for the multiple participants associated with the multiple computing devices.

6. The method of claim 3, wherein at least one computing device of the multiple computing devices is associated with a teacher, the method further comprising conducting the language learning session based at least in part on instructions received from the at least one computing device associated with the teacher.

7. The method of claim 1, further comprising analyzing the speech data to determine the performance result, wherein analyzing the speech data is performed in part over one or more networks.

8. The method of claim 7, wherein analyzing the speech data includes determining the performance result as a quantitative feedback.

9. The method of claim 8, wherein the quantitative feedback comprises a score.

10. The method of claim 8, wherein the quantitative feedback comprises a graph that represents a performance level of the user during the language learning session.

11. The method of claim 7, wherein analyzing the speech data comprises;
    determining when pauses occur in the speech data;
    determining one or more words, phrases or syllables spoken after the pauses;
    identifying the one or more words, phrases or syllables as problem words, phrases or syllables for the user.

12. The method of claim 1, further comprising recording the speech data, and communicating the speech data to another computing device over one or more networks.

13. The method of claim 1, wherein the correspondence between the at least one word spoken by the user and the at least part of the text presented on the computing device comprises a temporal correspondence based at least in part on a time when the at least one word was spoken and a time when the at least part of the text was presented.

14. A method comprising:
    providing text, via one or more networks, to a computing device, the text configured to be output as a guide to a user to speak one or more words of a language as part of a language learning session;
    receiving, from the computing device, recorded speech data representative of a recognition of the one or more words spoken by the user;
    generating, based at least in part on the recorded speech data, one or more confidence values, wherein an individual confidence value indicates a likelihood that a correspondence between at least one word spoken by the user and at least part of the text was correctly recognized; and
    analyzing the one or more confidence values to calculate a performance evaluation for the language learning session.

15. The method of claim 14, further comprising:
    determining when pauses occur in the recorded speech data;
    determining one or more words, phrases or syllables spoken after the pauses;
    identifying the one or more words, phrases or syllables as problem words, phrases or syllables for the user; and
    providing the problem words, phrases or syllables to the computing device.

16. The method of claim 14, further comprising;
    accessing one or more previous performance evaluations for one or more prior language learning sessions for the user;
    determining, based on the performance evaluation for the language learning session and the one or more previous performance evaluation for the one or more prior language learning sessions, an overall performance level of the user speaking the language; and providing the overall performance level to the computing device.

17. The method of claim 14, wherein the correspondence between the at least one word spoken by the user and the at least part of the text comprises a temporal correspondence based at least in part on a time when the at least one word was spoken and a time when the at least part of the text was output.

18. One or more non-transitory computer-readable media storing instructions that, when executed by one or more processors, cause a computing device to:
   present text to guide a user to speak a language as part of a language learning session;
   record words spoken by the user in the language;
   generate speech data representative of a recognition of the words spoken by the user, wherein the speech data comprises one or more confidence values, an individual confidence value indicating a likelihood that the computing device correctly recognized a correspondence between at least one word spoken by the user and at least part of the text presented; and
   evaluate the one or more confidence values to calculate a performance result for the language learning session.

19. The one or more non-transitory computer-readable media of claim 18, wherein the instructions further cause the computing device to:
   determine when pauses occur in the speech data;
   determine one or more words, phrases or syllables spoken after the pauses;
   identify the one or more words, phrases or syllables as problem words, phrases or syllables for the user; and
   provide the problem words, phrases or syllables as language learning feedback.

20. The one or more non-transitory computer-readable media of claim 18, wherein the correspondence between the at least one word spoken by the user and the at least part of the text presented comprises a temporal correspondence based at least in part on a time when the at least one word was spoken and a time when the at least part of the text was presented.

* * * * *